United States Patent
Christensen et al.

(10) Patent No.: US 9,221,539 B2
(45) Date of Patent: Dec. 29, 2015

(54) ROTORCRAFT WITH INTEGRATED LIGHT PIPE SUPPORT MEMBERS

(71) Applicant: TRAXXAS LP, McKinney, TX (US)

(72) Inventors: Casey Christen Jens Christensen, McKinney, TX (US); Otto Karl Allmendinger, Rowlett, TX (US); Richard Douglas Hohnholt, Coppell, TX (US); Kent Poteet, Lucas, TX (US); Scott Rollin Michael Schmitz, Lewisville, TX (US); Thomas Blackwell, Crossroads, TX (US)

(73) Assignee: TRAXXAS LP, McKinney, TX (US)

( * ) Notice: Subject to any disclaimer, the term of this patent is extended or adjusted under 35 U.S.C. 154(b) by 0 days.

(21) Appl. No.: 14/542,503

(22) Filed: Nov. 14, 2014

(65) Prior Publication Data

US 2015/0245516 A1  Aug. 27, 2015

Related U.S. Application Data

(62) Division of application No. 14/461,228, filed on Aug. 15, 2014.

(60) Provisional application No. 61/866,530, filed on Aug. 15, 2013.

(51) Int. Cl.
| | |
|---|---|
| *B64C 27/00* | (2006.01) |
| *B64C 39/02* | (2006.01) |
| *A63H 17/28* | (2006.01) |
| *A63H 27/00* | (2006.01) |

(52) U.S. Cl.
CPC .............. *B64C 39/024* (2013.01); *A63H 17/28* (2013.01); *A63H 27/12* (2013.01); *B64C 2201/027* (2013.01)

(58) Field of Classification Search
CPC ............... B64C 2201/027; B64C 2201/042; B64C 2201/108; B64C 2201/127; B64C 39/028; B64C 39/024; B64D 47/08; B64D 2203/00; A63H 27/12; A63H 17/28; A63H 17/32

See application file for complete search history.

(56) References Cited

U.S. PATENT DOCUMENTS

| | | | | |
|---|---|---|---|---|
| 4,184,119 | A | * | 1/1980 | Kerruish ..................... 455/344 |
| 5,720,651 | A | * | 2/1998 | Chien ............................ 451/95 |
| 6,688,936 | B2 | * | 2/2004 | Davis ............................ 446/37 |

(Continued)

FOREIGN PATENT DOCUMENTS

| | | |
|---|---|---|
| EP | 1245257 A2 | 10/2002 |
| JP | H01-201294 A | 8/1989 |

OTHER PUBLICATIONS

Jameschen072; "The UDi U839 review"; RC Groups; May 15, 2014; http://www.rcgroups.com/forums/showthread.php?t=2167429.

(Continued)

*Primary Examiner* — Philip J Bonzell
*Assistant Examiner* — Michael Kreiner
(74) *Attorney, Agent, or Firm* — CARR Law Firm PLLC

(57) ABSTRACT

A radio controlled model rotorcraft implemented with features improving ease of flight and flight performance by increasing structural stability, increasing rotorcraft visibility and orientation awareness through the use of multifunctioning, configurable, and aesthetically pleasing components, while also increasing resistance to damage from crashes through use of impact and vibration absorbing components.

30 Claims, 13 Drawing Sheets

(56) References Cited

U.S. PATENT DOCUMENTS

| | | | |
|---|---|---|---|
| 6,921,313 B2* | 7/2005 | Yu | 446/39 |
| 7,367,863 B2* | 5/2008 | Fosbenner et al. | 446/438 |
| D628,658 S | 12/2010 | Wurm | |
| 7,980,740 B2* | 7/2011 | Hu | 362/500 |
| 2002/0098768 A1* | 7/2002 | Kuo et al. | 446/39 |
| 2004/0150144 A1* | 8/2004 | Goepfert et al. | 267/136 |
| 2007/0049159 A1* | 3/2007 | Kulis | 446/438 |
| 2011/0301784 A1* | 12/2011 | Oakley et al. | 701/2 |
| 2012/0056041 A1 | 3/2012 | Rhee et al. | |
| 2012/0083945 A1* | 4/2012 | Oakley et al. | 701/2 |
| 2012/0234969 A1 | 9/2012 | Savoye et al. | |
| 2014/0117149 A1* | 5/2014 | Zhou et al. | 244/17.23 |

OTHER PUBLICATIONS

UDI RC; "U839 Nano 3D RC Quadcopter with 6-Axis Gyro, 2.4 GHz 4-Channel. 306° —Rolling Action"; UDIRCTOYS Industry Co,. Ltd., Shantou City, Guangdong, China; photographs of typical unit with manual; Aug. 6, 2014; via Battery Superstore and amazon.com.

WL Toys; "Skylark V636 Headless Mode 2.4 G 4CH 6 Axis Quadcopter RTF"; Shantou Chenghai WL Toys Industrial Co., Ltd., Shantou City, Guangdong, China; web page offer for sale, Banggood.com/Banggood Ltd., Aug. 13, 2014.

Gemini Industries Ltd. / WL Toys; "Skylark R/C Quadcopter"; Gemini Industry Ltd., Shenzen, China; photographs of typical unit with manual; Aug. 13, 2014; via Gemini (HK) Ind. Ltd.

Mohr, Tim; "Hobbico/Great Planes at the '14 HobbyTown USA Convention"; Jul. 11, 2014; Big Squid RC.com.

Barnes, Jon; "HobbyTown National Convention Held Jul. 9-10, 2014 in Lincoln, Nebraska"; Jul. 19, 2014; FLY RC Magazine web page: http://www.flyrc.com/hobbytown-national-convention-held-july-910-2014-in-lincoln-nebraska/.

GAUI.CO.UK; "Gaui 500X Quad Flyer"; Hinckley, Leicestershire, England; Apr. 27, 2013; https://web.archive.org/web/20130427105355/http://www.gaui.co.uk/.

Empire Hobby; "Gaui LED Set (2 Red, 2Wh, 4 Lens)"; Mesa, Arizona; Jul. 21, 2011; http://www.empirerc.com/gaui-led-set-2-red-2-wh-4-lens-p-5954.html?sess=90d4b90f52b3db5305af59d96954e6fa.

Gaui; "Beijing Model Expo—Gaui 500X Quad Flyer"; Gaui Tai Shih Hobby Corp., New Taipei City, Taiwan; photographs of trade show booth and typical unit; May 1, 2011.

Mulcahy, Chris; "DJI Innovations Phantom RTF—Review"; RCGroups.com; Feb. 5, 2013; http://www.rcgroups.com/forums/showthread.php?t=1811071.

DJI; "Phantom Quick Start Manual V1.3"; DJI Innovations, Shenzhen, China; Jan. 22, 2013.

DJI; "Phantom Advanced Manual V1.1"; DJI Innovations, Shenzhen, China; Jan. 15, 2013.

HGT; "DJI Phantom Full inner nudity"; RC Groups; Jan. 11, 2013; http://www.rcgroups.com/forums/showpost.php?p=23788478&postcount=1121.

Draganfly; "DraganFlyer X4-P"; Draganfly Innovations Inc., Saskatoon, Canada; Mar. 23, 2013; http://www.draganfly.com/uav-helicopter/draganflyer-x4p/gallery/pictures/.

Draganfly; "Draganflyer X4-P"; Draganfly Innovations Inc., Saskatoon, Canada; Apr. 3, 2013; http://www.draganfly.com/uav-helicopter/draganflyer-x4p/gallery/pictures/.

Parrot; "AR.Drone 2.0 User Guide"; Parrot SA, Paris, France; May 3, 2012; http://ardrone2.parrot.com/support.

Hubsan; "The Hubsan X4 2.4GHz R/C Series 4 Channel Six-Axis Gyro" photographs of typical unit with manual; ; Hubsan, Tangxia Town, Dong guan, China; Sep. 10, 2012.

Horizonhobby; "Blade mQX Ultra Micro Quad Copter"; HorizonHobby, Champaign, IL; photographs of typical unit; Jan. 25, 2012.

Horizonhobby; "Blade Nano Qx 18 Gram Quad-Copter"; HorizonHobby, Champaign, IL; photographs of typical unit; Jul. 8, 2013.

DJI; "Phantom"; DJI Innovations, Shenzhen, China; photographs of typical unit ; Jan. 31, 2013.

Ares; "ETHOS PQ—A Handful of Fun"; Firelands Group, LLC, Champaign, IL; http://ares-rc.com\ethosPQ/ ; Jul. 31, 2014.

Mohr, Tim; "Firelands Group at the 2014 HobbyTown USA Convention, ARES RC Ethos PQ nano quad"; Jul. 11, 2014; Big Squid RC.com.

Big Squid RC; ETHOS PQ Quadcopter; Jul. 31, 2014; Big Squid RC; http://www.bigsquidrc.com/ethos-pq-quadcopter/.

Hobbytown; "ETHOS PQ Instruction Manual"; Firelands Group LLC, Champaign, IL; Jul. 31, 2014.

Hobbico; "Dromida Ominus" quadcopter; Hobbico Inc., Champaign, IL; photographs of typical unit; Sep. 18, 2014.

Ares; "ETHOS HD Large Quad, Full 1080 HD Video, One Package"; Firelands Group, LLC, Champaign, Il; Jul. 2014.

Parrot; "AR.Drone 2.0" web page; Parrot SA, Paris, France; Jan. 2012.

Wikipedia; "Parrot AR.Drone"; Parrot SA, Paris, France; Jan. 2013.

Parrot; "AR.Drone 2.0" photographs of typical unit; Parrot SA, Paris, France; May 26, 2012.

PCT/US2014/051361; International Search Report and Written Opinion; Dec. 15, 2015.

* cited by examiner

ROTORCRAFT WITH INTEGRATED LIGHT PIPE SUPPORT MEMBERS

CROSS-REFERENCE TO RELATED APPLICATIONS

This application is a division of, and claims the benefit of the filing date of, co-pending U.S. patent application Ser. No. 14/461,228 entitled ROTORCRAFT WITH INTEGRATED LIGHT PIPE SUPPORT MEMBERS, filed Aug. 15, 2014, which claims the benefit of the filing date of, U.S. provisional patent application Ser. No. 61/866,530 entitled QUADCOPTER WITH INTEGRATED LIGHT PIPE SUPPORT MEMBERS, filed Aug. 15, 2013, the entire contents of which are incorporated herein by reference for all purposes.

BACKGROUND OF THE INVENTION

1. Field of the Invention

The present invention relates to radio controlled model rotorcrafts, and, more particularly, to means and methods of assembling and retaining components of radio controlled model rotorcraft while enhancing aesthetically pleasing aspects of a rotorcraft.

2. Description of the Related Art

Radio controlled model rotorcrafts are propeller driven remote controlled vehicles configured for flight. Some important design considerations of particular importance in regard to radio controlled model rotorcrafts are flight performance and stability, ease of control by the user, durability, aesthetics, and cost. Several characteristics inherent to radio controlled model rotorcraft operation and appearance add to the difficulty in adequately addressing these design considerations. This is especially true as the number of propellers utilized by the radio controlled model rotorcraft is increased.

Radio controlled model rotorcraft are difficult to operate for several reasons. For one, they are configured to move in three dimensions as opposed to two. Additionally, radio controlled model rotorcraft are capable of reaching incredible speeds during flight, such as when descending from high altitude, reducing the response time for a user to correct course to avoid a crash.

Users may also have difficulty discerning the orientation of the radio controlled model rotorcraft during flight, especially while performing aerial tricks or when operating a rotorcraft that has several propellers, causing the radio controlled model rotorcraft to have a similar appearance from all sides. Confusion as to the orientation of the radio controlled model rotorcraft during flight greatly increases the likelihood of a loss of control by the user and a subsequent crash.

Stable flight requires the radio controlled model rotorcraft body be sufficiently stiff to resist deflection and twisting during flight, in particular, during acceleration. Increasing stiffness generally involves using more material and increasing the overall weight of the rotorcraft. Durability may be enhanced through the use of tougher materials and the addition of protective components to sufficiently insulate sensitive parts from vibration and impact, adding weight.

For flying vehicles weight increases are undesirable, however, since weight increases degrade performance. Further, weight increase may result in increased cost if higher power or additional thrust-generating components are used to compensate for the additional weight.

A need exists for a radio controlled model rotorcraft implemented with design features that simultaneously promote flight performance and stability, ease of control by the user, and durability without incurring cost or weight penalties, and while also incorporating desirable aesthetic attributes.

SUMMARY

Provided is an radio controlled model rotorcraft implemented with features improving ease of flight and flight performance by increasing structural stability, increasing rotorcraft visibility and orientation awareness through the use of multifunctioning, configurable, and aesthetically pleasing components, while also increasing resistance to damage from crashes through use of impact and vibration absorbing components.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, and for the most part, details concerning well-known features and elements have been omitted inasmuch as such details are not considered necessary to obtain a complete understanding of the present invention, and are considered to be within the understanding of persons of ordinary skill in the relevant art. Additional details are shown in the Appendix attached hereto and incorporated by reference for all purposes.

Figure 1:
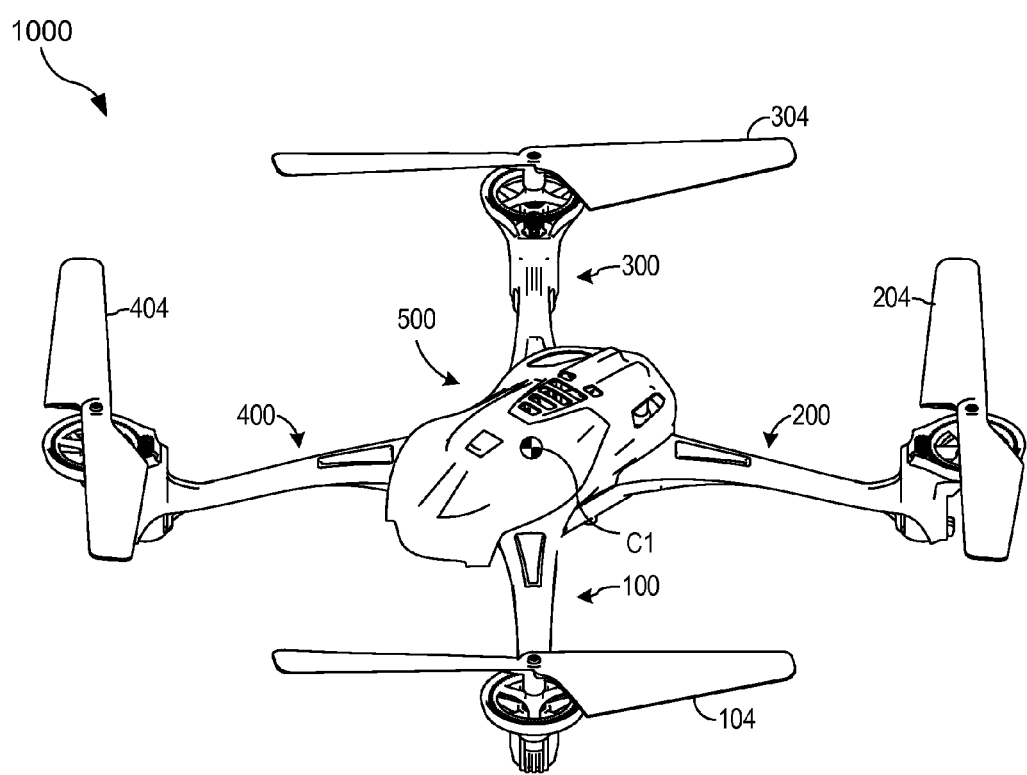
FIG. 1 is a perspective view of a quadcopter rotorcraft.

Referring first to FIG. 1, a particular embodiment of a radio controlled model rotorcraft, a rotorcraft 1000, is shown. According to the embodiment shown, the rotorcraft 1000 may comprise four rotor assemblies: a first rotor assembly 100; a second rotor assembly 200; a third rotor assembly 300; and, a fourth rotor assembly 400. The rotorcraft 1000 may further comprise a center pod assembly 500.

Each of the first rotor assembly 100, the second rotor assembly 200, the third rotor assembly 300, and the fourth rotor assembly 400 may be implemented with a first propeller 104, a second propeller 204, a third propeller 304, and a fourth propeller 404, respectively. A rotorcraft provided with four propellers, such as the rotorcraft 1000 shown and described herein, may be referred to as a quadcopter. Airborne motion of the rotorcraft 1000 may be controlled by rotation of the propellers 104, 204, 304, and 404 and by adjustment of the angular velocities of each propeller by known methods to provide adjustment of thrust and torque to support stable flight of the rotorcraft 1000.

Each of the rotor assemblies 100, 200, 300, and 400 may couple to the center pod assembly 500 at the inboard end of the rotor assembly 100, 200, 300, and 400 and may extend, along its length, away from the center pod assembly 500. The rotor assemblies 100, 200, 300, and 400 may rigidly couple the propellers 104, 204, 304, and 404 to the center pod assembly 500, fixing the position and orientation of each respective propeller 104, 204, 304, and 404 relative to each other and to the center of mass, C1, of the rotorcraft 1000.

Figure 2:
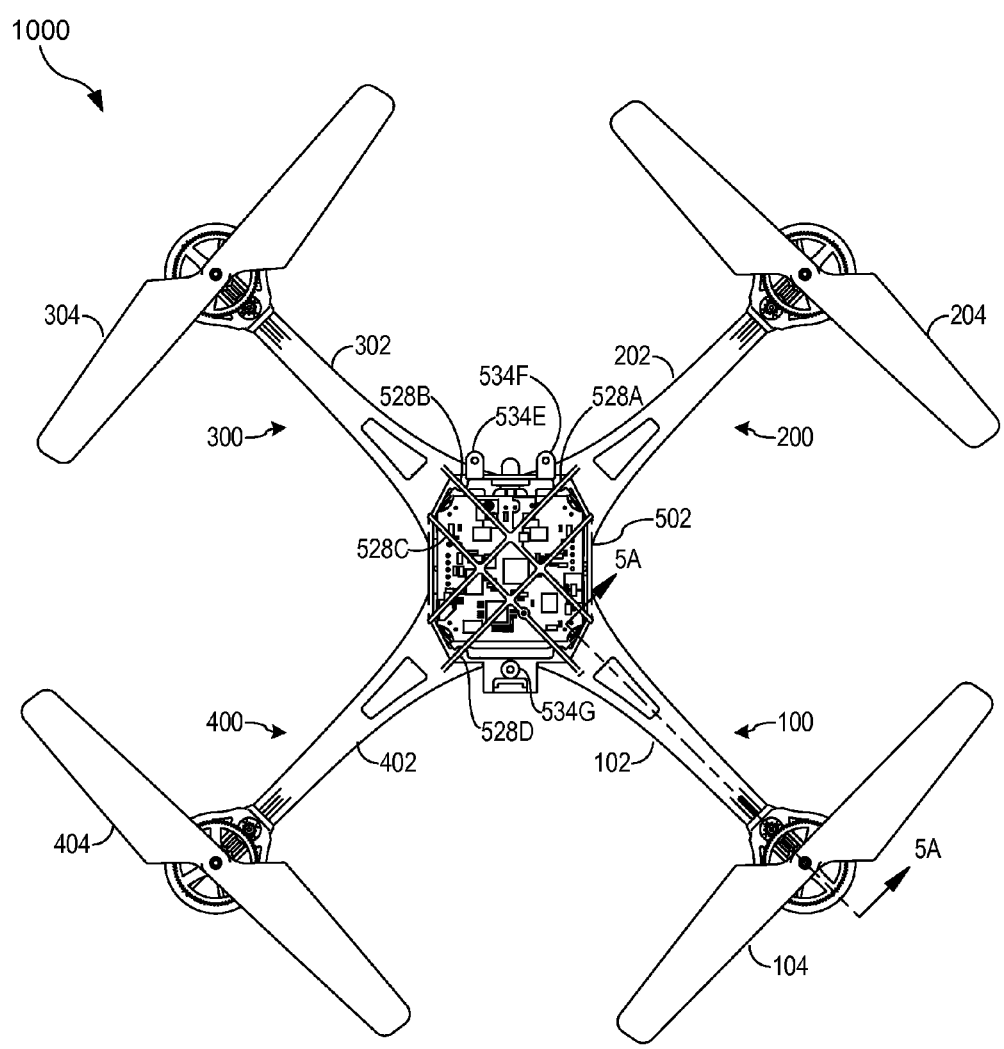
FIG. 2 is a top view of a quadcopter rotorcraft with a pod cover removed for clarity.

Referring to the embodiment shown in FIGS. 1 and 2, the propellers 104, 204, 304, and 404 may be arranged in a substantially rectangular configuration about the center of mass C1, which may be within the center pod assembly 500. In a particular embodiment, for example, the distance between the axis of rotation of opposing propellers may be about 23.5 centimeters (cm.) (i.e. between propellers 104 and 304), while the distance between the axis of rotation of adjacent propellers may be about 16.6 cm. (i.e. between propellers 104 and 204). In an embodiment, the propellers 104, 204, 304, and 404 may be positioned at a substantially equal distances from the center of mass C1.

In alternative embodiments, a radio controlled model rotorcraft may be provided with more, fewer, or additional components than those shown in the particular embodiment, the rotorcraft 1000, described herein. Additionally, in alternative embodiments, a radio controlled model rotorcraft may have a different component arrangement than that shown in the particular embodiment, the rotorcraft 1000, described herein. Specifically, alternative embodiments may include more or fewer rotor assemblies that may be positioned in a substantially triangular or circular configuration about the rotorcraft center of mass. Additionally, in an embodiment, the rotorcraft center of mass may be located at a point external to the center pod assembly 500.

The components of the first rotor assembly 100 of a particular radio controlled model rotorcraft embodiment, the rotorcraft 1000, are described herein. The components of the rotor assemblies 200, 300, and 400 may have substantially similar construction and features as the corresponding components of the first rotor assembly 100. Further, the components of the rotor assemblies 200, 300, and 400 may perform substantially the same functions as the corresponding components of the first rotor assembly 100. The convention of describing components of only the first rotor assembly 100 is adopted for the purpose of avoiding unnecessary and repetitive language, only, and shall not foreclose from the scope of this disclosure a wide range of variations, modifications, changes and substitutions that would be understood by those skilled in the art as expressly, or implicitly, disclosed here.

Referring to FIGS. 2-10, the first rotor assembly 100 may include a first arm 102, a first propeller 104, a first support member 106, and fastener assemblies 108A-D In alternative embodiments, additional, fewer, or different components than those shown may be provided.

Figure 5A:
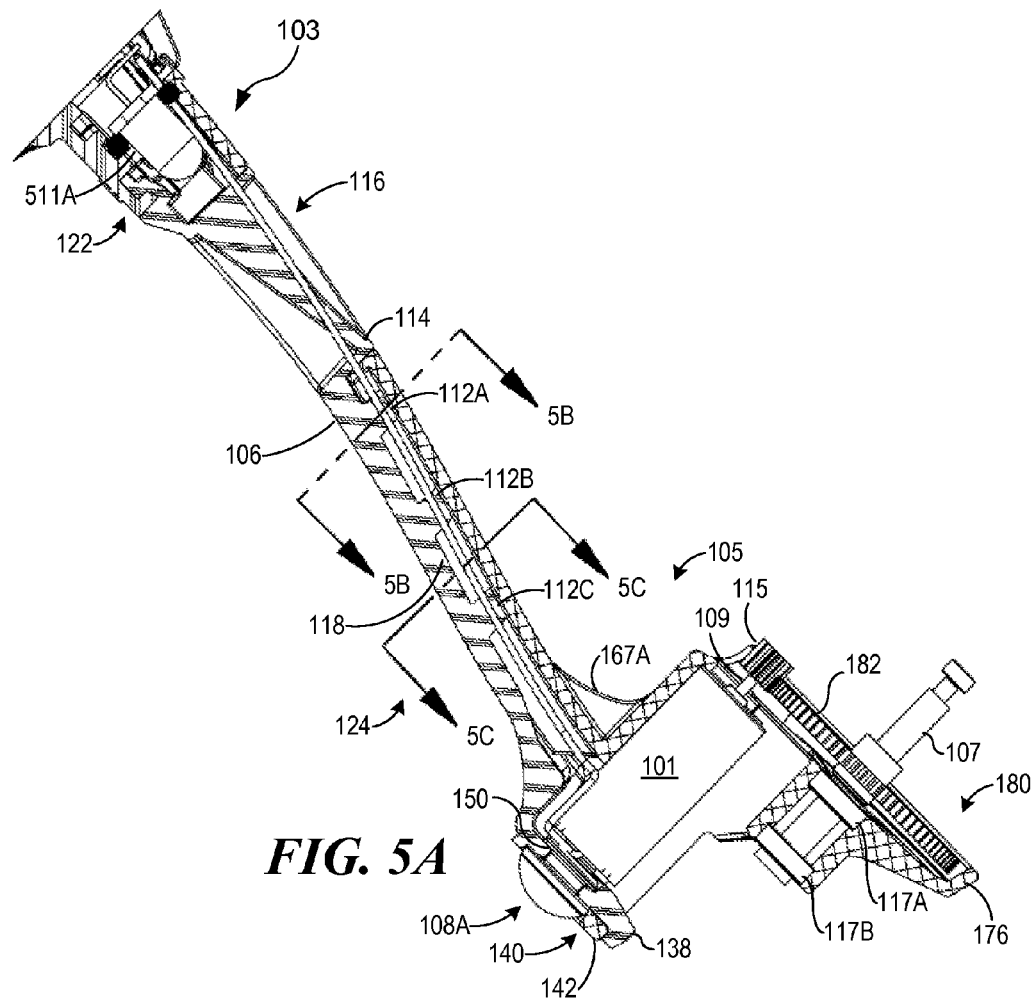
FIG. 5A is a first cross-sectional view of a rotor assembly of a quadcopter rotorcraft taken along line 5A-5A shown in FIG. 2.
Figure 7:
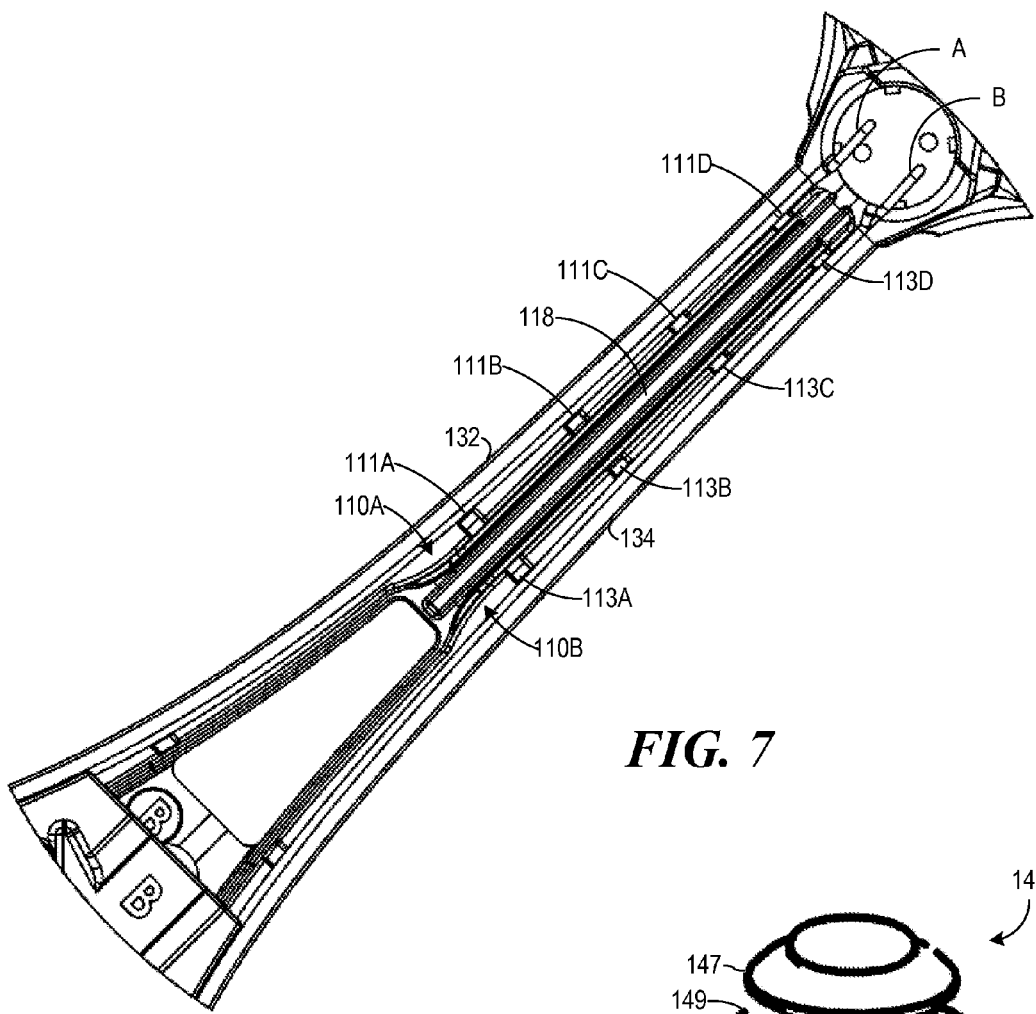
FIG. 7 is a bottom view of a first arm showing wire channels.

In an embodiment, the first arm 102 may operatively couple the first rotor assembly 100 to the center pod assembly 500, as shown in FIG. 2. Referring to FIGS. 5A and 7, the first arm 102 may include an inboard end 103, an outboard end 105, wire channels 110, a cut through portion 114, and a plurality of coupling members. In a particular embodiment, the first arm 102 may be provided with additional, fewer, or different components.

The first arm 102 may be comprised of a single piece of rigid or semi-rigid material. For example, in a particular embodiment, the first arm 102 may be made from nylon or other similar material. It will be understood by persons of ordinary skill in the art that the first arm 102 may alternatively be made from any other suitable material (e.g. plastics, metals, wood, and composites) based on the requirements for flight of the particular radio controlled model rotorcraft embodiment and other structural, aesthetic, and cost factors.

Figure 4:
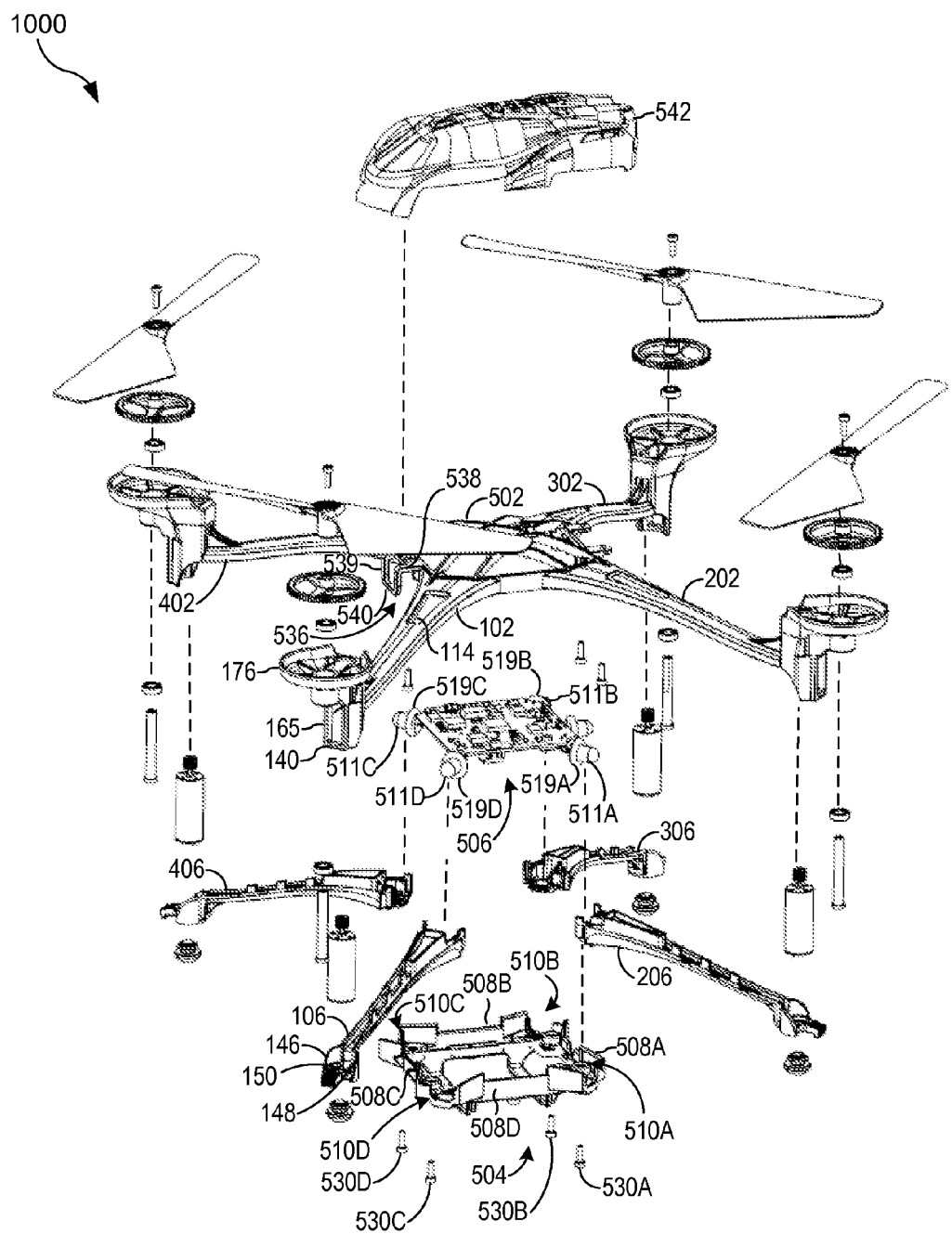
FIG. 4 is an exploded view of a quadcopter rotorcraft.

As shown in FIGS. 4 and 5, in an embodiment, the first arm 102 may couple to, or, alternatively, be integrally formed with the center pod assembly 500 at the inboard end 103. The first arm 102 may extend along its length in a direction away from the center pod assembly 500. As viewed from the side, the first arm 102 may have a downwardly sloping arced profile, whereby the outboard end 105 is disposed below the inboard end 103. Alternatively, the first arm 102 may have a profile that is substantially linear, dog-legged, or the like, or may have a profile with multiple bends or curves.

Figure 5B:
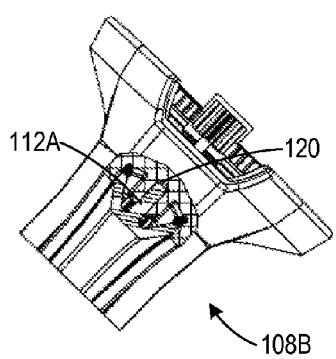
FIG. 5B is a cross-sectional view of a second fastener assembly taken along line 5B-5B shown in FIG. 5A.

As shown in FIGS. 1, 4, 5B, and 5C, the first arm 102 may have a curved, substantially "C" shaped, outer cross sectional shape, oriented with the apex of the curve facing upward. In an embodiment, and as shown in FIGS. 5A and 5B, within the inner portion of the outer cross section the first arm 102 may be provided with an interlocking slot 120.

The interlocking slot 120 may have an open end facing substantially downward. The interlocking slot 120 may abut the inner portion of the curve defining the outer cross sectional shape of the arm 102 substantially at the apex of the curve. The interlocking slot 120 may be formed from two substantially parallel flanges extending inward from the inner surface of the first arm 102 curved outer cross section. The interlocking slot 120 may extend a distance along the length of the first arm 102 from the outboard end 105 and terminating at the cut through portion 114. The interlocking slot may function as a fastening feature, as described below, in reference to fastener assembly 108B.

Viewing the first arm 102 from above, as shown in FIG. 2, the first arm 102 may be curved along each side, whereby the first arm 102 may be thinner at the outboard end 105 and wider at the inboard end 103. In an alternative embodiment, the first arm may have a substantially uniform width along its length, or, may widen along its length such that the outboard end 105 is wider than the inboard end 103.

Referring to FIG. 7, the first arm 102 may be provided with wire channels 110A and 110B for retaining and routing electrical wires A, B along the length of the first arm 102. In an embodiment, wires A, B may be routed between rotor assembly 100 components near the outboard end 105 of the first arm 102, like the first motor 101, for example, and controls components that may be enclosed within the center pod assembly 500, like the PCBA 506, for example, to support powered flight of the rotorcraft 1000.

Each wire channel 110A and 110B may extend along the length of the first arm 102 from the inboard end 103 to the outboard end 105 along the underside of the first arm 102. The wire channels 110A and 110B may be positioned along either side of interlocking slot 120. In an embodiment, the first arm 102 may have fewer or more wire channels 110 that may extend along only a portion of the length of the first arm 102, or, alternatively, along substantially the entire length of the first arm 102.

Each wire channel 110A, B may have dimensions, such as width w, and may be provided with retaining tabs 111A-C and 113 A-C, respectively, for holding wires A, B in place and substantially resisting migration of wires within each wire channel 110A, B. In a particular embodiment, for example, the width, w, of each wire channel 110A, B may be about 0.65 cm. The retaining tabs 111, 113 may extend laterally across a portion of the width, w, of the respective wire channels 110 so that the wires A, B may be pushed around the retaining tabs 111, 113 and into place in the wire channels 110A, B. Alternatively, the retaining tabs 111, 113 may extend across substantially the entire width, w, of the wire channels 110A, B with wires A, B being fed through the gap formed.

In an alternative embodiment, the wire channels 110 A, B may be provided with fewer or more retaining tabs 111, 113 than shown in FIG. 7. Further, in an alternative embodiment, the wire channels 110A, B may be provided with zero retaining tabs 111, 113. In such embodiments, the wire channels A, B may be implemented with other retaining devices, such as external clips, ties, and the like. Alternatively, the wire channels 110A, B may not include any retaining devices or external fasteners.

Referring to FIG. 7, the first arm 102 may include a cut through portion 114 forming an opening for seeing through a portion of the first arm 102. In an embodiment, the cut through portion 114 may be disposed along top surface of the first arm 102, substantially centered about the apex of the outer curved surface of the first arm 102 and extending a distance along the length of the first arm 102. In the embodiment shown, the cut through portion 114 may have a substantially trapezoidal shaped perimeter.

In alternative embodiments, the first arm 102 may be provided with zero, one, or a plurality of cut through portions 114. Further, in an alternative embodiment, the cut through portion, or portions, 114 may be positioned at other locations along the outer surface of the first arm 102 and, additionally, may have s different perimeter shape, or shapes. For example, in an embodiment, the first arm may be provided with a plurality of circular cut through portions 114 disposed in an irregular pattern along the length of the outer surface of the first arm 102.

The first arm 102 may also include a plurality of coupling members comprising components of the fastening assemblies 108A-D for coupling with, receiving, or partially forming other rotorcraft 1000 components, such as the motor 101, the first support 106, the motor receptacle assembly 160, the propeller shaft receptacle assembly 170, and the torque transfer assembly 180. The coupling members of the first arm 102 are described in detail below, and in reference to fastening assemblies 108A-D.

Turning now to the top-view of the rotorcraft embodiment, the rotorcraft 1000, shown in FIG. 2, the first propeller 104 is shown. In a particular embodiment, the first propeller 104 may have two blades and a diameter of 140 millimeters (mm). In alternative embodiments, the propeller 104 may be implemented with a different quantity of blades having a larger or smaller diameter. The first propeller 104 may be rotatably coupled to the outboard end 105 of the first arm 102, as will be described further subsequently, and in reference to the propeller shaft receptacle assembly 170 and the torque transfer assembly 180.

In an embodiment, the propellers 104, 204, 304, and 404 may comprise matched pairs of counterclockwise and clockwise rotating propellers to provide a stable spinning configuration in accordance with known methods comprising the prior art. It will be understood by persons of ordinary skill in the art that the number of blades, diameter, pitch, and spinning configuration may be varied to support agility, stability, and efficiency of a rotorcraft, such as the rotorcraft 1000 described herein, in flight.

Turning now to FIGS. 4-10, several views of the first support member 106 are shown. According to the embodiment shown, the first support member 106 may perform many functions, including: providing configurable and decorative lighting along the length of the first rotor assembly 100 for aiding users in identifying directional orientation of the rotorcraft 1000 during flight; providing structural support to the first arm 102, thereby increasing the stiffness of the rotor assembly 100 for more stable flight; receiving, coupling, or securing other components to the rotorcraft 1000.

Importantly, in the context of flying devices such as radio controlled model rotorcrafts, having a single component perform multiple functions, as the first support member 106 may, may allow for incorporation of additional features into the device without incurring a corresponding "mass penalty," resulting in a potentially less costly and more capable device. Additionally, the number of component parts may be reduced, and may provide the benefits of easier assembly and maintenance through a reduction in the number of external fasteners needed, for example, screws, clips, inserts, and the like.

Figure 3:
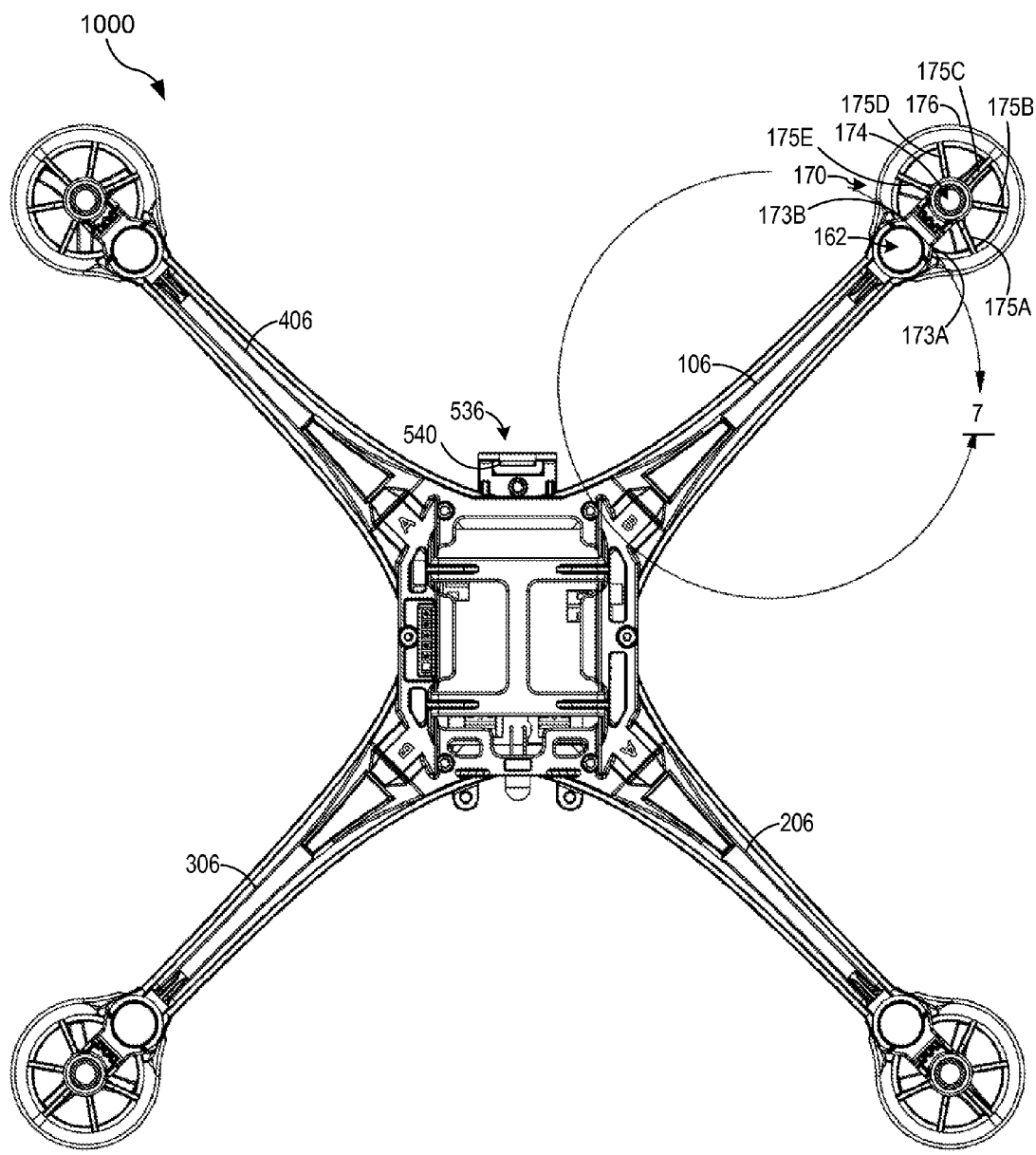
FIG. 3 is a bottom view of a quadcopter rotorcraft.

As shown in FIG. 3, the first support member 106 may couple to the center pod 500 and to the first arm 102. As shown in FIGS. 4-6B, in an embodiment, the first support member 106 may include an exposed surface 116, an inboard end 122, an outboard end 124, an indented portion 126, and a plurality of coupling members comprising components of the fastening assemblies 108A-D. In alternative embodiments, the first support member may include fewer, additional, or different components.

In an embodiment, the first support member 106 may comprise a piece of semi-rigid or rigid material that may be transparent or semi-transparent and capable of distributing light received from a light source substantially throughout its volume, illuminating the surfaces of the transparent or semi-transparent material. For example, the first support member 106 may be made from an acrylic, polycarbonate, or other like material.

The material may appear substantially clear or, alternatively, may have a color. Coloring may be provided through any known methods, such as through tinting, coating, or other known method comprising the prior art. Further, whether the material appears substantially clear, or has a color, the material may be capable of receiving light of a specific color and emitting light of a different color when illuminated. For example, the first support member 106 may be composed of a substantially clear material having the properties described above and may, when receiving white light illuminate and emit light of another color, perhaps green. In another example, the first support member may have a color, perhaps red, and may illuminate and emit red light upon receiving white light or colored light.

In certain embodiments, the first support member 106 may be made entirely of material having the rigidity and illuminating characteristics described above, so that substantially the entire outer surface of the first support member 106 may be illuminated when light is received by any portion of the support member 106. Further, in such an embodiment, the first support member 106 may be made from a single piece of material having the properties described above.

In alternative embodiments, the first support member 106 may be composed of two or more materials, with at least one of the materials having the rigidity and illuminating properties described above. In such an embodiment, the portion of the first support member 106 composed of the material capable of being illuminated may be implemented so that it extends from the inboard end 122 along the length of the first support member 106, and toward the outboard end 124. Further, in such an embodiment, the portion of the first support member 106 composed of the material capable of being illuminated may extend along substantially the entire length of the first support member 106.

Figure 6A:
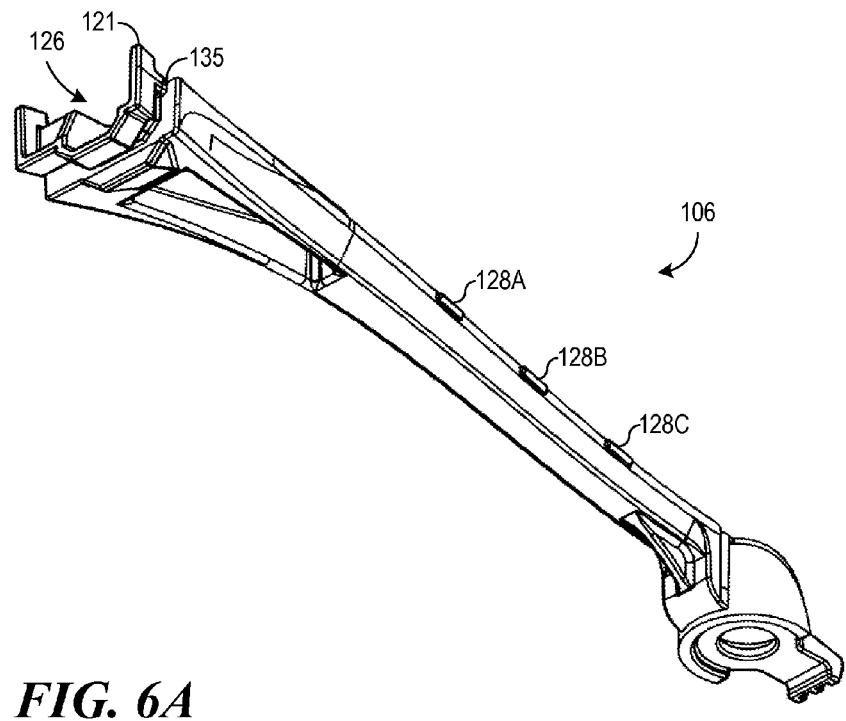
FIGS. 6A and 6B are a perspective and a bottom view, respectively, of a support member.
Figure 6B:
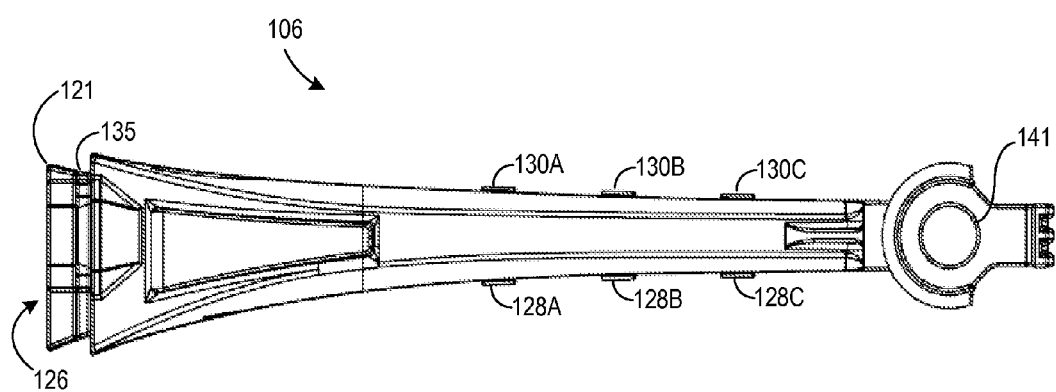
Figure 9:
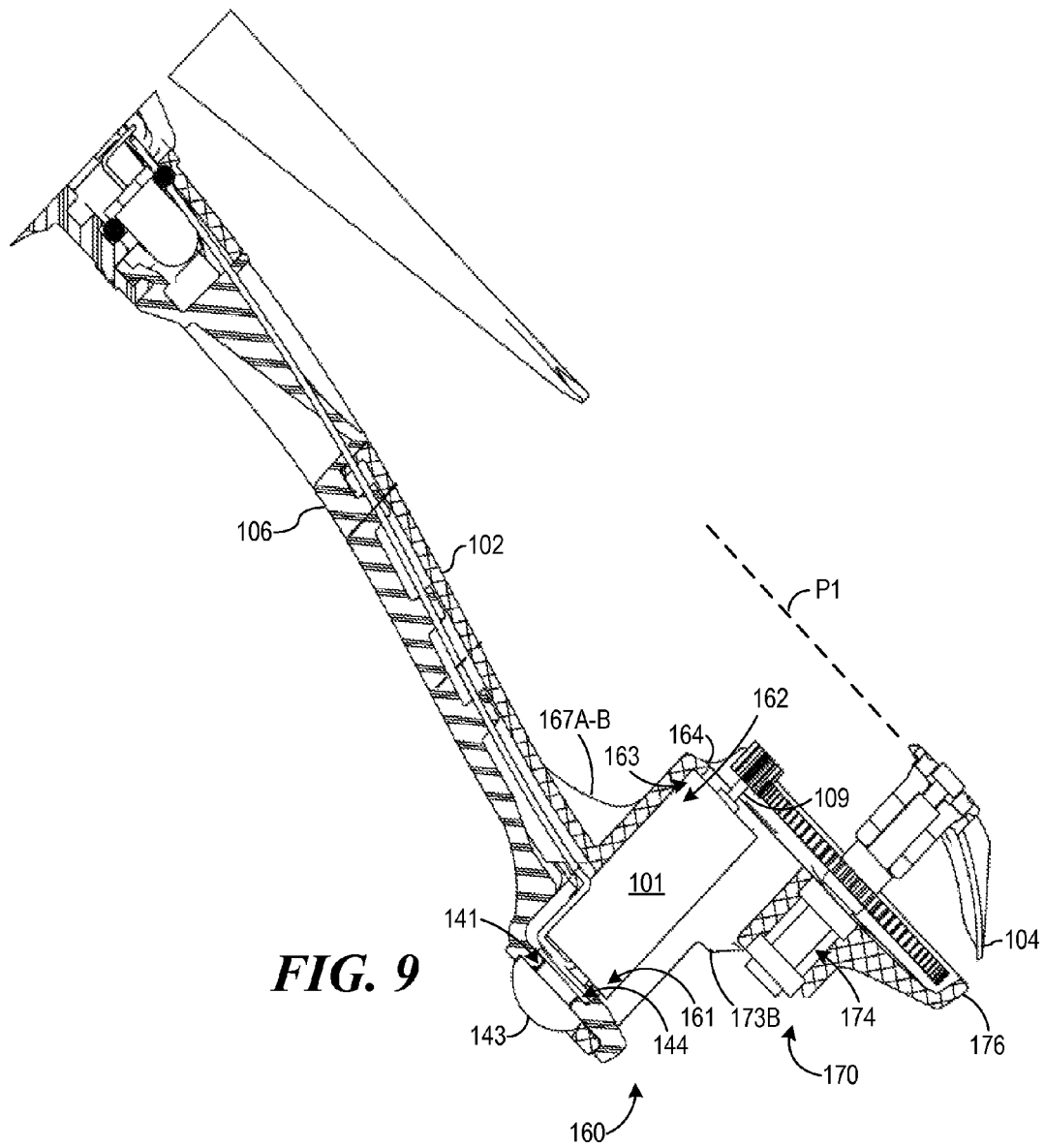
FIG. 9 is second cross-sectional view of a rotor assembly of a quadcopter rotorcraft taken along line 5A-5A shown in FIG. 2.

As shown FIGS. 3, 6A, and 6B, the first support member 106 may couple to the center pod assembly 500 at the inboard end 122 and extend along its length in a direction away from the center pod assembly 500. Viewed from the side, as shown in FIG. 9, the first support member 106 may have a downwardly sloping arced profile similar to that of the first arm 102, whereby the outboard end 124 is disposed below the inboard end 122. In alternative embodiments, the first support member 106 may have a profile that is substantially linear, dog-legged, or the like, or may have a profile with multiple bends or curves.

Referring to FIG. 5A, the first support member 106 may be provided with an exposed surface 116. The exposed surface may extend through the cut-through portion 114 of the first arm 102, when the first arm 102 and first support member 106 are coupled. The exposed surface 116 may composed of an illuminating material as described above so that a portion of the illuminated first support member 106 may be viewed from above the rotorcraft through opening formed by the cut through portion 114 of the first arm 102.

As shown in FIGS. 4 and 5A, the exposed surface 116 may be disposed along the side of the first support member 106 to which the first arm 102 couples, protruding upward from the body of the support arm 106. The exposed surface 116 may extend a distance along the length of the first support member 106. The position of exposed 116 may align with the position of the cut through portion 114 of the first arm 102 when the first arm 102 and first support member are coupled.

The exposed surface 116 may be configured to have a perimeter shape substantially coincident with the perimeter shape of the cut through portion 114 of the first arm 102. In the embodiment shown, the cut through portion 114 may have a substantially trapezoidal shaped perimeter. The exposed surface 116 may fit within the opening in the first arm 102 formed by the cut through portion 114. Further, the exposed surface 116 may protrude to a height above the surface of the first support member 106 sufficient to substantially "fill" the opening formed in the first arm 102 by the cut through portion 114.

In alternative embodiments, the quantity, location, perimeter shape, and height of the exposed surface, or surfaces 116, may vary in accordance with the corresponding features of the cut through portion, or portions 114, of the first arm 102, so that the exposed surface 116 may "fill" the opening formed in the first arm 102 by the cut through portion 114.

Figure 5C:
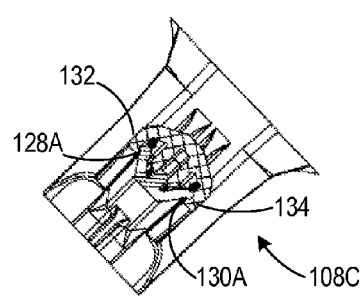
FIG. 5C is a cross-sectional view of a third fastener assembly taken along line 5C-5C shown in FIG. 5B.

Referring to FIGS. 5A-C, the first support member 106 may have a curved, substantially "C" shaped, outer cross section extending along the portion of its length outboard of the exposed surface 116. The curved cross sectional shape may be oriented with the apex of the curved surface facing substantially downward and with the "open end" facing upward and toward the first arm 102. The first support member 106 may have an outer cross section configured to mate to the first arm 102 along the length of each component. The outer cross section size of the first support member 106 may be sized to fit within, and extend into, the downwardly facing open end of the first arm 102 formed by the inner surface of the outer cross section of the first arm 102.

The first support member 106 may be provided with a ridge 118 extending along a portion of the length of the first support member 106. The ridge 118 may be disposed along the inner surface formed by the substantially "C" shaped cross section of the first support member 106 and protrude a. The ridge 118 is described further below, in regard to the fastening assembly 108B.

As shown in FIG. 6A, the first support member 106 may be provided with an indented portion 126 disposed at the inboard end 122 and extending into the body of the first support member 106 along the length of the first support member 106. The indented portion 126 may form an open area within the body of the first support member 106 providing clearance for a light source 511 to be partially inserted into when the first support member 106 is coupled to the center pod assembly 500, as described below. The indented portion 126 may extend into the first support member 106 along the length of the first support member 126 and terminate just inboard of the exposed surface 116.

Viewed from below, as shown in FIG. 3, the first support member 106 may have a profile that is curved along each side so that the width of the first support member 106 thins along the length of the first support member 106, with the first support member 106 wider at the inboard end 122 and thinner at the outboard end 124. In an alternative embodiment, the first arm may have a substantially uniform width along its length, or, may widen along its length such that the outboard end 124 is wider than the inboard end 122.

The profile shape of the support member 106 may be substantially similar to the profile shape of the first support member shown in FIG. 2 and described above. The first support member 106 profile width may be sufficiently less than that of the first arm 102 along the length of each component, allowing for the first support member to be slid into and mate with the first arm 102.

Referring to the embodiment shown in FIGS. 3 and 5A, the first support member 106 may be removably coupled to the first arm 102. The first support member 106 may structurally support the first arm 102 against displacement from flexing or twisting that may result from acceleration or impact during operation of the rotorcraft 1000. The coupled first arm 102 and first support member 106 may exhibit increase stiffness along the length of the rotary assembly 100 and provide for more stable flight of the rotorcraft 1000. Additionally, the coupled first arm 102 and first support member 106 partially enclose rotary assembly components, such as the motor 101, for example, and may trap and protect rotorcraft 1000 components, such as the wires A, B routed within wire channels 110A, B as shown in FIGS. 5A, B (not labeled).

The rotary assembly 100 may include the fastener assemblies 108 A-C for coupling the first support member 106 to the first arm 102. In alternative embodiments, the first support member 106 may be coupled to the first arm 102 using some, all, or none of the fastener assemblies 108 A-C.

Referring to FIGS. 4 and 5, a first fastener assembly 108A may comprise a hook member 138 extending from the outboard end 124 of the first support member 106. The hook member 138 may be configured to fit within and extend at least partially through an aperture 140 formed in the outboard end 105 of the first arm 102. An extension of the hook member 138 may catch and extend over a bar portion 142 (also shown in FIG. 5A) of the aperture 140 when the hook member 138 is inserted in the aperture 140 to secure the outboard end 124 of the first support member 106 to the outboard end 105 of the first arm 102.

Referring to FIGS. 4, 5A, and 9, the first fastener assembly 108A may further comprise a cup member 144 formed from curved side portions 146, 148 and a bottom surface 150. Edges of the side portions 146, 148 and the bottom surface 150 may align with edges of the aperture 140 formed in the outboard end 105 of the first arm 102 to form a housing that may be a motor cradle assembly 160 for receiving and partially enclosing a motor 101 as is described further, below. When the hook member 138 is inserted into the aperture 140, the first support member 106 may be secured against displacement of the first support member 106 in the inboard-outboard direction.

Referring to FIGS. 5A and 5B, a second fastener assembly 108B may comprise interlocking tabs 112A-C extending from the ridge 118 a distance further inward and toward the center of "C" shaped cross section of the first support member 106. The ridge 118 may extend along a length of the first support member 106 as described above. Each tab 112A-C is configured to mate with the interlocking slot 120 positioned on an underside of the first arm 102. Each tab 112A-C may fit into a portion along the length of the interlocking slot 120 to establish a snug fit.

When the interlocking tabs 112A-C are fit into the interlocking slot 120, the first support member 106 may be secured against displacement of the first support member 106 in the inboard-outboard direction and may resist twisting of the joined structure comprising first support member 106 and first arm 102. Although the embodiment shown is implemented with three interlocking tabs 112, in an alternative embodiment fewer, or additional, interlocking tabs 112 may be provided. For example, in an embodiment, one continuous interlocking tab 112 may be provided that may extend along substantially the entire length of the corresponding interlocking slot 120.

Referring to FIGS. 5A, 5C, 6A, 6B, and 7, a third fastener assembly 108C may comprise a series of first snap tabs 128A-C and second snap tabs 130A-C of the first support member 106. The first snap tabs 128A-C and second snap tabs 130A-C may be disposed opposite one another along the outer surface of the "C" shaped outer profile of the first support member 106 near the open end of the "C". The first snap tabs 128A-C and second snap tabs 130A-C may protrude a distance outward from the outer surface of the first support member 106 and extend along a portion of the length of the first support member 106. The first snap tabs 128A-C and second snap tabs 130A-C, respectively, may fit under and engage a first lip 132 and a second lip 134, respectively, of the first arm 102 when the first support member 106 is slid into the underside of the first arm 102 as described above.

Although the embodiment shown is implemented with three first snap tabs 128 and second snap tabs 130, in an alternative embodiment fewer, or additional, snap tabs 128 and second snap tabs 130 may be provided. For example, in an embodiment, continuous snap tabs 128, 130 may be provided and may extend along substantially the entire length of the corresponding lips 132, 134.

The first lip 132 and the second lip 134, respectively, of the first arm 102 may be disposed opposite one another along the inner surface of the "C" shaped outer profile of the first arm 102 substantially at the open end of the "C". The first lip 132 and the second lip 134 may protrude a distance inward from the inner surface of the first arm 102 and extend along a portion of the length of the first arm 102.

The first lip 132 and second lip 134 may each be a single, continuous lip extending along substantially the whole length, or, alternatively, only a portion of the length of the first arm 102. In another alternative embodiment, additional first lips 132 and second lips 134 may be provided, with each lip 132, 134 extending along a portion of the length of the first arm 102 corresponding to a location of a snap tab 128, 130 of the first support member 106.

The first snap tabs 128A-C and the second snap tabs 130A-C may lock the first support member 106 to the first arm 102, when the snap tabs 128, 130 are engaged with the first lip 132 and the second lip 134, respectively. Under a heavy impact, flexibility in the support member 106 may allow the first snap tabs 128A-C and the second snap tabs 130A-C to unsnap from the respective first lip 132 and the second lip 134 to prevent structural damage to other portions of the rotorcraft 1000.

Figure 10:
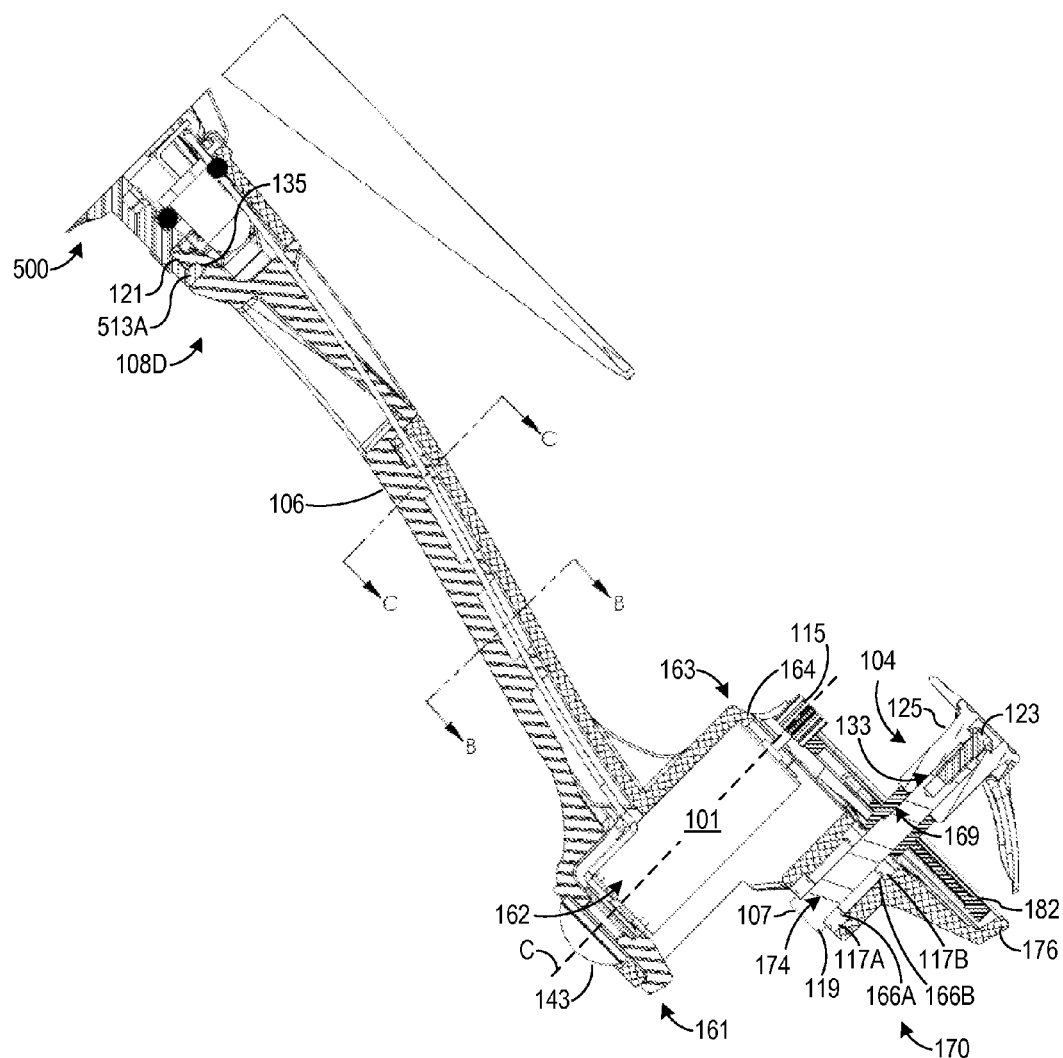
FIG. 10 is a third cross-sectional view of a rotor assembly of a quadcopter rotorcraft taken along line 5A-5A shown in FIG. 2, wherein the line 5A-5A is taken through a torque transfer assembly.

The rotary assembly 100 may also include a fastener assembly 108 D, as shown in FIGS. 6A, 6B, and 10, for removably coupling the first support member 106 to the center pod assembly 500 at the inboard end 122 of the first support member 106.

Referring to FIGS. 6A, 6B, and 10, the fourth fastener assembly 108D may comprise a collar 135 and a hoop member 121. The hoop member 121 may be disposed at the inboard end 122 of the first support member 106 extend a distance along the length of the first support member 106 toward the outboard end 124. The hoop member 121 may further extend about the cross section of the inboard end 122 of the first support member 106, having a boundary shape as best shown in FIG. 6A.

The hoop member 121 may abut the collar 135, with the collar 135 disposed outboard to the hoop member 121 and extending about the cross section of the inboard end 122 of the first support member 106. The collar 135 may form a groove around a portion of the cross section of the first support member 106. The collar 135 may have a boundary shaped similarly to that of the hoop member 121 but sized slightly smaller than that of the hoop member 121 along each length defining the boundary shape of the hoop member 121.

The hoop member 121 and the collar 135 may be configured to couple with the center pod assembly 500, by engaging the collar 135 with an opening formed in the center pod assembly 500 with a perimeter shape and size substantially coincident to the boundary shape and size of the collar. The hoop member may then be trapped within the opening formed and secure the first support member to the center pod assembly 500 as described below with respect to FIG. 10. When the hoop member 121 and collar 135 are coupled to the center pod assembly 500, the first support member 106 may be secured against disengagement of the first support member 106 from the center pod assembly 500, and may resist twisting of the first support member 106.

When the first support member 106 is mated with the first arm 102, the structure of the combination of first arm 102 and first support member 106 is configured to substantially prevent flexing and twisting of the first arm 102 and displacement of the motor relative to the center pod assembly 500. Minimizing flexing and twisting of the first arm 102 promotes stability of control over the rotorcraft 1000 during flight and may prevent crashes.

Additionally, with the first support member 106 coupled to the first arm 102 and the center pod assembly 500 using fastening assemblies 108A-D, as described, the need for external fasteners, such as screws, clips, inserts, and the like, to couple the rotary assembly 100 components may be greatly reduced, or eliminated. Coupling the rotary assembly 100 components as described above may provide the additional advantages of ease of assembly and disassembly, while allowing for removable coupling of the rotary assembly 100 components, notably, the first support member 106.

In the embodiment shown and described above, the support members 106, 206, 306, and 406 may be both removably coupled to the rotorcraft 1000 and be configured to function as a light pipe, capable of illuminating along the outer surfaces of the support members 106, 206, 306, and 406 when receiving light from light source.

The rotorcraft 1000 may further be implemented with a support member color arrangement configurable by the user through removal and replacement of an undesired support member with one having the desired color characteristics at each rotor assembly. For example, a user may configure both forward facing support members of rotorcraft 1000 to illuminate red by replacing the forward facing support members with support members configured to illuminate red in response the light received from the light source within the center pod assembly. Users may configure the light arrangement in accordance with their color preference. The configurable light pipe feature may allow for the rotorcraft 1000 to be easier to fly in low visibility settings, such as in the evening, or in an indoor environment, and may also aid the user by allowing the orientation of the rotorcraft to be easily discerned, based on the support member color configuration, during flight. The ability to determine orientation of the rotorcraft 1000 may be further enhanced by the cut through portion 114 of the first arm, through which the illuminated light from the support member below may be seen.

With the color configuration viewable from both the top and bottom of the rotorcraft 1000, the orientation may be determined by the user while performing tricks during flight that may cause the rotorcraft to be in an inverted position, as well as in settings where the user may operate the rotorcraft 1000 from an elevated position.

The first support member 106 may further be configured to provide aesthetically pleasing lines and features. For example, when the first support member 106 is mated with the first arm 102, the first support member 106 may be shaped to have a curvature that follows or complements the curvature of the first arm 102 and the curvature of the center pod assembly 500, as shown in FIGS. 1 and 5A.

The first arm 102 and first support member 106, as coupled may also form one or more housings for receiving and partially enclosing other rotary assembly 100 components. Referring to FIGS. 3, 9, and 10, the first arm 102 and first support member 106 may couple at the outboard ends 105, 124 of each to form a housing that may be a first motor cradle 160 for receiving and at least partially enclosing a motor 101.

In the embodiment shown, the first motor cradle 160 may comprise a motor channel 162 extending through a portion of the outboard end 105 of the first arm 102 and in a direction that may be substantially perpendicular to the plane P1 in which the first propeller 104 rotates. It will be understood by those of ordinary skill in the art that alternative embodiments may include a motor channel 162 oriented in a direction not substantially perpendicular to the plane of rotation of the propellers, with the motor provided with a torque transfer assembly configured to accommodate the specific motor channel 162 orientation. When the first support member 106 is fully coupled to the first arm 102, the cup member 144 may form a bottom portion of the motor cradle 160 and may substantially close the motor channel 162 at a bottom end 161.

In the embodiment shown, the motor channel 162 may partially form a substantially cylindrical housing with dimensions configured to fit a cylindrically shaped motor, e.g. the first motor 101. In alternative embodiments, the motor channel 162 may be configured to partially form a housing of a different shape, configured to accommodate the particular shape of the motor provided. A bottom portion of the first motor 101 may be configured to rest in the cup member 144. The diameter of the motor channel 162 may be configured to substantially prevent shifting of the first motor 101 within the motor channel 162.

In a particular embodiment, the first motor 101 may comprise a coreless motor of about 8.5 mm by 20 mm (8.5×20) in size and configured to provide about 3.5 to 6.0 watts (W). The first motor 101 may have an operating voltage of about 2.0-4.0 volts (V), with a no-load speed between 40000 and 50000 revolutions per minute (rpm). The motor 101 may be configured to rotate the motor shaft 109 in either of two directions about the lengthwise axis of the motor shaft 109, as desired. It will be understood by persons of ordinary skill in the art that other types and sizes of motor may be utilized to support operation of the embodiments of the rotorcraft 1000.

Referring to FIG. 4, the motor channel 162 may further comprise a cut-out 165 extending through a side portion of the motor channel 162. The cut-out 165 may conserve materials and reduce weight of the outboard end 105 of the first arm 102. The cut-out 165 may comprise a size configured to provide sufficient structure to block displacement of the first motor 101 through the cut-out 165.

Referring to FIGS. 5A, 9, and 10, a motor channel rim forming an opening for a motor shaft may extend around a top end 163 of the motor channel 162 opposite from the cup member 144. A top portion of the first motor 101 comprising a motor shaft 109 and motor gear 115, such as a pinion or bevel gear, may extend through the motor shaft opening above the motor channel rim 164. The motor channel rim 164 may comprise a diameter configured to constrain the first motor 101 within the motor channel rim 164 and prevent the motor 101 from shifting within the motor channel 162.

Referring to FIG. 6B, the bottom surface 150 of the first support member 106, which may form the cup member 144, may comprise a foot hole 141. The foot hole 141 may comprise a size and shape configured to snugly fit a foot 143. The foot 143 may function as a landing support and as a shock absorber protecting the first motor 101 from impact forces.

Figure 8:
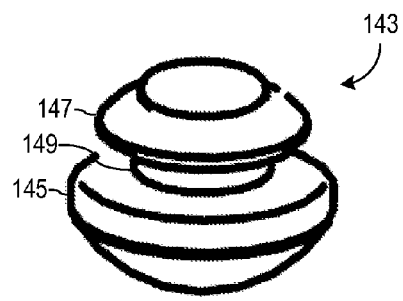
FIG. 8 is a perspective view of a foot.

Referring to FIG. 8, in an embodiment, the foot 143 may comprise a first flange 145 and a second flange 147 coupled by a stem 149. The foot 143 may comprise an elastic and resiliently deformable material, such as rubber, foam, and the like.

The second flange 147 may comprise a shape such as a substantially disk, conical or semi-conical shape. The shape of the second flange 147 may be configured to be compressed, twisted, or deformed to fit into the foot hole 141 (shown also in FIG. 6B) for installation of the foot 143. Once fit and pushed through the foot hole 141, the second flange 147 may expand and return to its original shape. In a particular embodiment, the second flange 147 may have a diameter of about 0.65 cm. and configured to resist removal of the foot from the foot hole 141, while the foot hole may have a diameter of about 0.42 cm.

The first flange 145 may comprise a shape to support use of the first flange 145 as a landing support and as a shock absorber protecting the first motor 101. A foot having substantially the same construction may be positioned at a foot hole of each other support member 206, 306, 406 to operate in combination to cushion landings and crashes of the rotorcraft 1000.

The shape of the first flange may comprise a semi-spherical shape having a height and base diameter. In some embodiments, the height may comprise about 0.3 cm. and the base diameter may comprise about 0.8 cm. A central axis of the foot 143 and central axis of the motor 101 may align along line C, shown in FIG. 10, to provide protection from shocks to the motor 101 at the bottom end of the motor 101.

Referring to FIGS. 3, 5A, and 9, in an embodiment, a portion of the first arm 102 may extend in an outboard direction from the motor channel 162 to form a housing that may be a propeller shaft cradle 170. The propeller shaft cradle 170 may be configured to support rotation of a propeller shaft 107 coupled to the first propeller 104. The propeller shaft cradle 170 may comprise a propeller shaft channel 174 extending through a portion of the outboard end 105 of the first arm 102 in a direction substantially perpendicular to the plane P1 in which the first propeller 104 rotates. The propeller shaft channel 174 may be offset from the motor channel 162 in an outboard direction relative to the inboard end 103 of the first arm 102.

The propeller shaft channel 174 may comprise a diameter configured to receive a propeller shaft 107 and bearings 117A, B for supporting rotation of the shaft 107. The propeller shaft channel 174 may be open at a top end to allow the propeller shaft 107 to extend above the top end of the propeller shaft channel 174 and to couple to the first propeller 104.

The propeller shaft cradle 170 may further comprise spokes 175A-E extending from the outer surfaces of the propeller shaft channel 174. The spokes 175A-E may extend to a gear rim 176. The gear rim 176 may comprise a substantially circular shape centered about the propeller shaft channel 174, and the circular shape may extend in a plane substantially parallel to the plane in which the first propeller 104 rotates. The spokes 175A-E may provide structural support and stability to the gear rim 176 and substantially prevent flexing of the gear rim 176 relative to the propeller shaft channel 174.

The propeller shaft cradle 170 may further comprise cradle brace members 173A and 173B. Each brace member 173A, B may bridge the offset between motor channel 162 and the propeller shaft channel 174. Each cradle brace member 173A, B may comprise a plate extending from edges of the cut-out 165 in the motor channel 162 to the side surfaces of the propeller shaft channel 174. Brace members 173A, B may provide support and stability to the propeller shaft channel 174 to prevent relative displacement between the first motor 101 and first propeller 104, including the gearing that ties the two components.

The first motor cradle 160 and the propeller shaft cradle 170 may be further supported from flexing, which may cause instability in powered flight, by bracing members 167A and 167B supporting an inboard side of the first motor cradle 160. The bracing members 167A, B may comprise a curved structure extending from a surface of the first arm 102 to a side surface of the first motor cradle 160. The curved surface may function substantially to prevent pitching during flight or in response to a hard landing of the first motor cradle 160 and the propeller shaft cradle 170 back towards the center pod assembly 500.

Referring to FIGS. 2, 4, 5A, 9, and 10, in an embodiment, the rotor assemblies 100, 200, 300, and 400 may further comprise a torque transfer assembly 180. In reference to the first rotor assembly 100 components, the torque transfer assembly 180 may operably couple the motor shaft 109 to the first propeller 104. In some embodiments, the torque transfer assembly 180 may comprise the motor gear 115 fixed to the motor shaft 109.

In some embodiments, torque is transferred to the motor gear 115 from the motor shaft 109 by a non-circular "D" shaped portion of the motor shaft. A central aperture in the motor gear 115 for receiving the motor shaft 109 may comprise a matching D-shape. The D-shape in the motor shaft may be machined flat at an initially circular section in the motor shaft 109. In other embodiments, the motor gear 115 may be attached to the motor shaft 109 by chemical bonding or by mechanical fasteners, such as a pin. In other embodiments, the motor gear 115 is formed integrally with the motor shaft 109.

In an embodiment, the torque transfer assembly 180 may further comprise a first gear 182 mounted co-axially with the propeller shaft 107 in the propeller shaft cradle 170. The first gear 182 may be configured to mechanically mesh with the motor gear 115 to transfer torque from the motor shaft 109 to the propeller shaft 107 and to support powered flight of the rotorcraft 1000. In a particular embodiment, the gear reduction ratio between the motor gear 115 and first gear 182 may be about 78/11 or 7.1:1.

The propeller shaft 107 and first propeller 104 may be mounted in the propeller shaft cradle and supported for rotation by a first bearing 117A and a second bearing 117B. The first bearing 117A may be a ball bearing with a central aperture. The first bearing 117A may be positioned against a first internal ridge 166A that extends along the internal walls of propeller shaft channel 174 proximal to the bottom end of the propeller shaft channel 174.

The propeller shaft 107 may comprise a shaft ridge 119 at a base end of the propeller shaft 107. The propeller shaft 107 may be inserted axially into the bottom end of the propeller shaft channel 174 and through the central aperture of the first bearing 117A to constrain the first bearing 117A between the shaft ridge 119 and the first internal ridge 166A.

The second bearing 117B may comprise a ball bearing with a central aperture and may be positioned against a second internal ridge 166B that extends along internal walls of the propeller shaft channel 174 proximal to the top end of the propeller shaft channel 174. The propeller shaft 107 may extend through the central aperture of the second bearing 117B and through the top end 163 of the propeller shaft channel 174.

A portion of the propeller shaft 107 may extend out of and above propeller shaft channel 174. The propeller shaft 107 may comprise a non-circular profile 169 extending along a length of the propeller shaft 107. The non-circular profile 169 may be configured to extend through a central aperture in the first gear 182 and mate with a non-circular profile of the central aperture for the transfer of torque from the first gear 182 to the propeller shaft 107.

The first gear 182 may be mounted on the shaft 107 between the second bearing 117B and the first propeller 104. The first gear 182 may be positioned substantially within the perimeter of the gear rim 176. A portion of the gear rim 176 may extend above the plane in which the first gear 182 rotates, providing protection to the first gear 182 from foreign objects impacting the first gear 182 from above. The spokes 175A-E, which may extend in a plane beneath the plane in which the first gear 182 rotates, providing protection to the first gear 182 from impacts to the first gear 182 from foreign objects approaching from beneath the first gear 182. The first propeller 104, which may also extend and rotate in a plane above the plane in which the first gear 182 rotates, may also provide protection to the first gear 182 from foreign objects approaching from above the first gear 182.

The non-circular profile 169 of the propeller shaft 107 may be further configured to extend through a central aperture a hub channel 133 of a hub 125 of the first propeller 104. The non-circular profile 169 may mate with a non-circular profile of the hub channel 133 to support the transfer of torque from the propeller shaft 107 to the first propeller 104.

In some embodiments, the propeller shaft 107 may be coupled to the first propeller 104 by a fastener 123, which may be a screw having a head portion. The fastener 123 may extend through a hub aperture 131 in the hub 125 of the first propeller 104 and threadably couple to a shaft aperture 168, which may extend axially through the portion of the propeller shaft 107 located within the hub channel 133. The head portion of the screw may be advanced until it sets against a hub ridge within the hub 125 to secure the first propeller 104 to the propeller shaft 107.

Figure 11B:
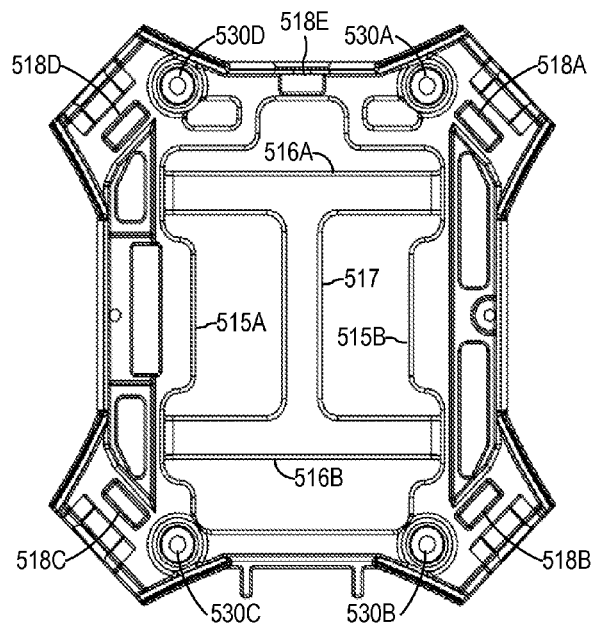
Figure 11C:
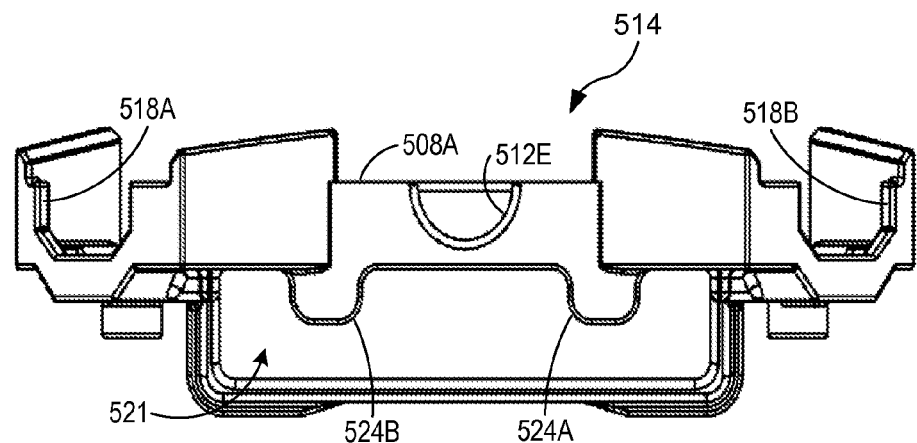
Figure 12:
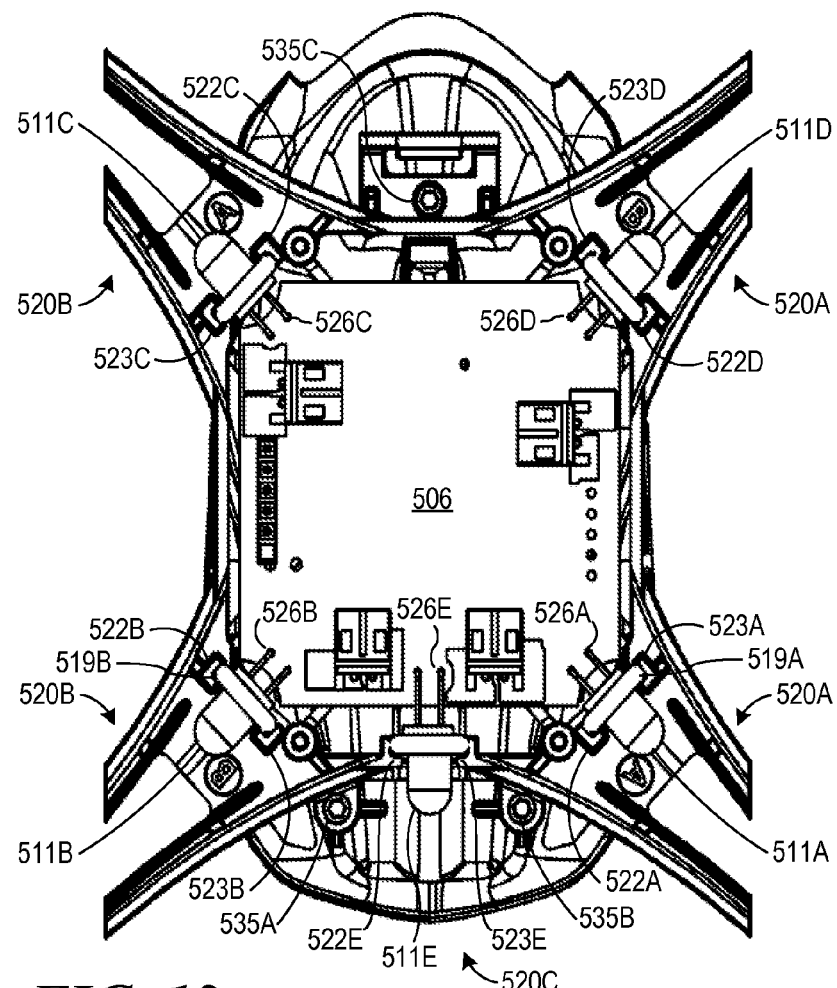
FIG. 12 is a bottom view of a center pod assembly with a base removed for clarity.

Referring to FIG. 4, the center pod assembly 500 may comprise a first cover 502 and base 504 coupled to form a housing for partially, or substantially, enclosing the control components of the rotorcraft 1000. The base 504 may be configured to be removable from the first cover 502. As shown in FIGS. 11B and 12, in an embodiment, the base 504 may be secured with fasteners 530A-D, for example, screws, extending through base apertures 532A-D and threadably coupling into corresponding apertures (not shown) in the underside of the first cover 502.

In some embodiments, the first cover 502 and arms 102, 202, 302, and 402 may be integrally formed from a single piece of material. In such embodiments, the material forming the single piece comprising the first cover 502 and arms 102, 202, 302, 402 may be composed of a nylon, or similar, material. Alternatively, the first cover 502 and arms 102, 202, 302, and 402 may, instead, be separate components and may be coupled to one another.

In an embodiment, the base 504 may be composed of nylon, or similar, material. It will be understood by persons of ordinary skill in the art that the components of the center pod assembly 500 may be made from other suitable materials (e.g. plastics, metals, wood, and composites) based on the requirements for flight of the rotorcraft 1000 and other structural, aesthetic, and cost factors.

Referring to FIGS. 4 and 11A-C, in an embodiment, the base 504 may comprise a mounting surface 505, side walls 508A-D, a plurality of light receptacles 510, a plurality of light openings 512, a plurality of front walls 513, and a plurality of locator recesses 518. In an alternative embodiment, the base 504 may comprise additional, fewer, or different components.

Figure 11A:
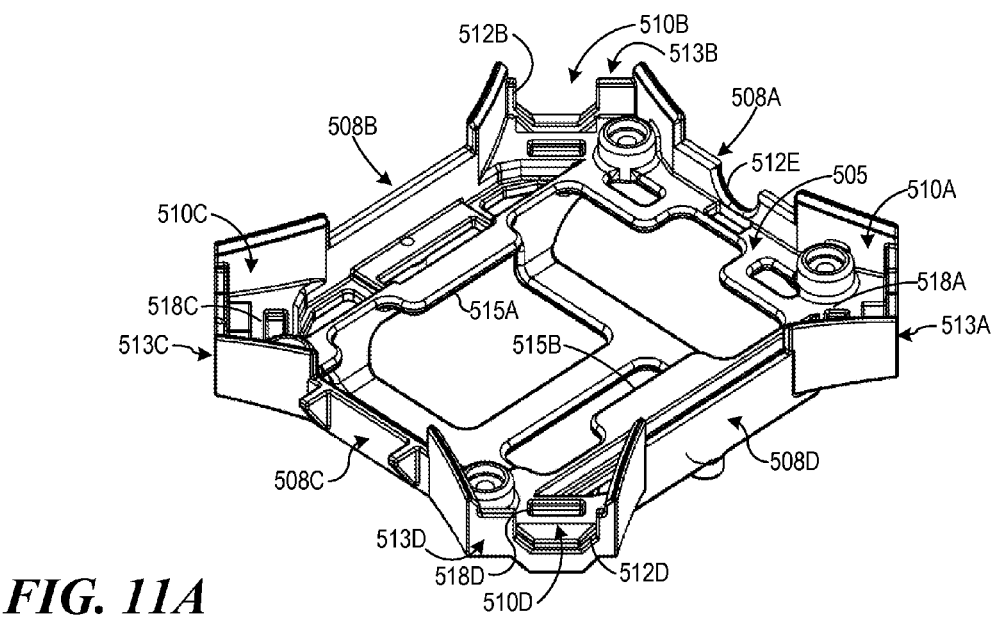
FIGS. 11A, B, and C are perspective, top, and rear views, respectively, of a base of a quadcopter rotorcraft.

The base 504 may be implemented with side walls 508A-D for at least partially enclosing the controls components, which, in an embodiment, may include a printed circuit board assembly (PCBA) 506, a battery (not shown), and a plurality of light sources 511A-E, In an embodiment, the side walls 508A-D may each be oriented to form a substantially vertical surface, as best shown in FIG. 11A. The side walls 508A-D may extend upward from a substantially horizontally oriented surface, a mounting surface 505. The mounting surface 505 may extend a distance inward from the lower edge of the side walls 508 along the perimeter of the base 504 for receiving and coupling components to the base 504.

As shown in the embodiment of FIG. 11A, the light receptacles 510A-D may extend from the corners where the side surfaces 508A-D meet. Each light receptacle 510A-D may comprise a generally trapezoidal shaped area that may partially enclose a light source 511A-D, respectively. In an embodiment, the front walls 513A-D may form the outermost surface defining the trapezoidal shape, as best shown in FIG. 11A. The front walls 513A-D may each be implemented with a cutout portion, forming light openings 512A-E.

The light openings 512A-E may be configured to have boundary shape that is substantially coincident with the cross sectional shape of the collar 135 of the support members 106, 206, 306, and 406. As described above, the support members 106, 206, 306, and 406 may couple to the base 504, with the collar 135 sliding into the light openings 512 A-D, trapping the hoop members 121 within the light receptacles 510 A-D when the base 504 is coupled to the first cover 502.

The light openings 512 A-E may also provide a passage through which light emitted by the light sources 511A-E may reach the exterior of the coupled center pod assembly 500, accessing the inboard ends of the support members 106, 206, 306, and 406.

Referring to FIG. 12, the light sources 511A-E may be disposed within the center pod assembly 500 and within the substantially horizontal plane of the PCBA 506. The light sources 511A-E may be oriented to face away from PCBA 506 and toward light receptacles 510A-E, so the light sources 511A-E may emit light in a direction substantially towards and through light openings 512A-E.

In an embodiment, the light sources 511A-E may be configured to emit light of any frequency within the visible spectrum. Further, in an embodiment, each light source 511A-E may be configured to emit light of the same color, for example, each light source may be configured to emit substantially 'white' light, or, alternatively some or all of light sources 511A-E may be configured to emit different 'colors' of light.

In an embodiment, the light sources 511A-E may be light emitting diodes (LED). In alternative embodiments, the light source may be an incandescent lamp, electroluminescent lamp, gas discharge lamp, laser, or the like.

Figure 13A:
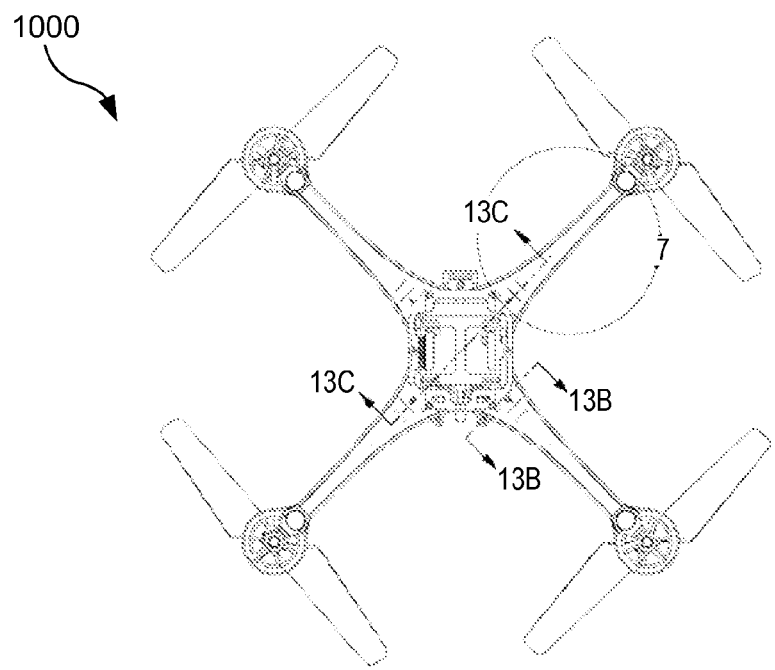
FIG. 13A is a bottom view of a quadcopter rotorcraft.
Figure 13B:
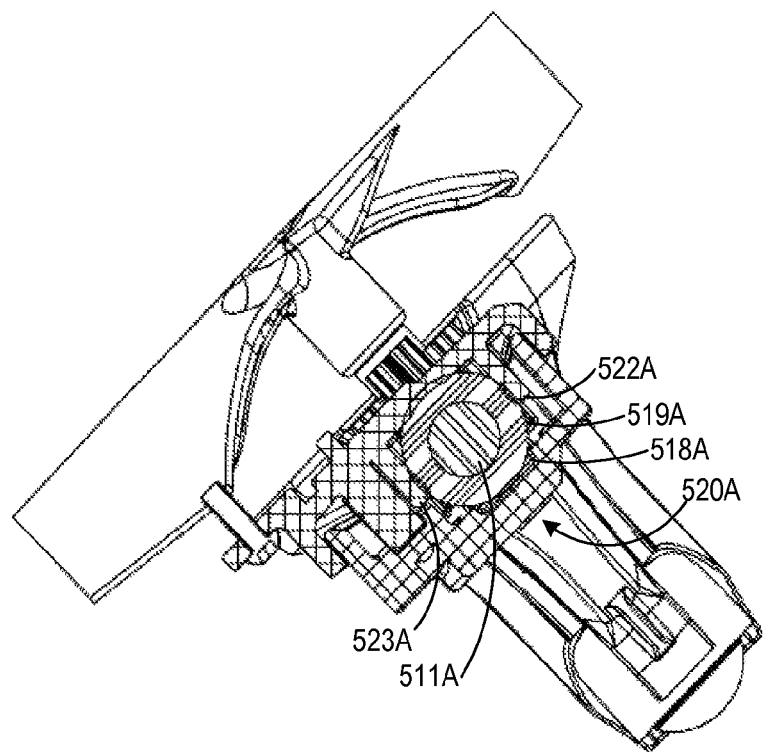
FIG. 13B is a cross-sectional view taken along line 13B-13B, the view showing a locator recess.

In an embodiment, and as shown in FIGS. 12 and 13B, each of the light sources 511A-E may be implemented with a locator 519A-E. The locators 519A-E may be made from a flexible or compliant material such as rubber, plastic, foam, or the like that may be resilient and capable of elastic deformation. The locators 519A-E may be sized to stretch and fit around a light source 511A-E, coupling snugly to the light source 511 and maintaining frictional contact along substantially the entire portion of the light source 511 to which the locator 519 is attached.

In a particular embodiment, for example, LEDs may be provided as a light source and rubber, or plastic, O-rings may be provided as a locator. In such an embodiment, the O-ring may be configured to have an internal circumference length of slightly less than the perimeter length of the LED to which the O-ring is applied. The O-ring may be stretched to fit over the LED and grip the LED along the O-ring inner surface, providing frictional resistance to removal of the placed O-ring. With the O-ring in place, the LED may be positioned, oriented, and secured in place through fixing the location of the affixed O-ring.

Referring to FIGS. 11, 12, and 13A-C, in an embodiment, the base 504 may further comprise a plurality of locator recesses 518A-D for receiving, positioning, and securing locators 519A-D, thereby setting the location and orientation of the light source 511A-D to which the locator 519A-D is affixed. The locator recesses 518A-D may each be a downwardly extending depression formed into the mounting surface 505 and disposed at the lower portion of each light receptacle 510A-D. The locator recesses 518A-D may be configured to direct the light emitted from the received light source 511A-D in a desired direction, such as towards a light opening 512A-D so that the light may access the inboard ends of the support members 106, 206, 306, and 406.

In an embodiment, a fifth locator recess 518E may be provided for setting the location and orientation of the taillight, light source 511E. The locator recess 518E may be located adjacent to side surface 508A and may also be configured to support, position, and secure a light source 511E, so that the light source 511E may partially pass through the light opening 512E.

Referring to FIG. 12, the first cover 502 may comprise locator cradles 520A-D extending from an undersurface of the first cover 502 at the base of each arm 102, 202, 302, and 402. Each locator cradle 520A-D may comprise a first column 522A-D spaced from a second column 523A-D. The width between the first column 522A and the second column 523A may be configured to snugly fit each respective locator 519A-D mounted around each respective light source 511A-D in an interference fit. A locator cradle 520E may be configured in a similar manner to locator cradles 520A-D for supporting the light source 511E. The locator cradle 520E may comprise a first column 522E and second column 523E spaced from each other for snugly fitting the light source 511E, having the locator 519E between the columns 522E, 523E.

As shown in FIGS. 11B, 12, 13B, and 13C, in an embodiment the locator cradles 520A-E may be disposed and oriented within the first cover 502 at locations corresponding to, and aligning with the locations of the locator recesses 518A-E of the base 504, so that the locator cradles 520A-E and the locator recesses 518A-E may simultaneously receive the locators 519A-E when the base 504 and first cover 502 are coupled. In alternative embodiments, the locator recesses 518, alone, or, alternatively, the locator cradles 520, alone, may be provided for receiving and setting the position of the locators 519 and light sources 511 provided.

Referring to FIG. 4, the PCBA 506 may comprise a main circuit board including components 507 that would be known to persons of ordinary skill in the art, including but not limited to a control processor, a transceiver, a radio-frequency antenna, sensors (e.g. gyroscopic sensors and accelerometer sensors) motor controllers, and a data interface. The PCBA 506 may also comprise power connectors for each light source 511A-E.

Figure 13C:
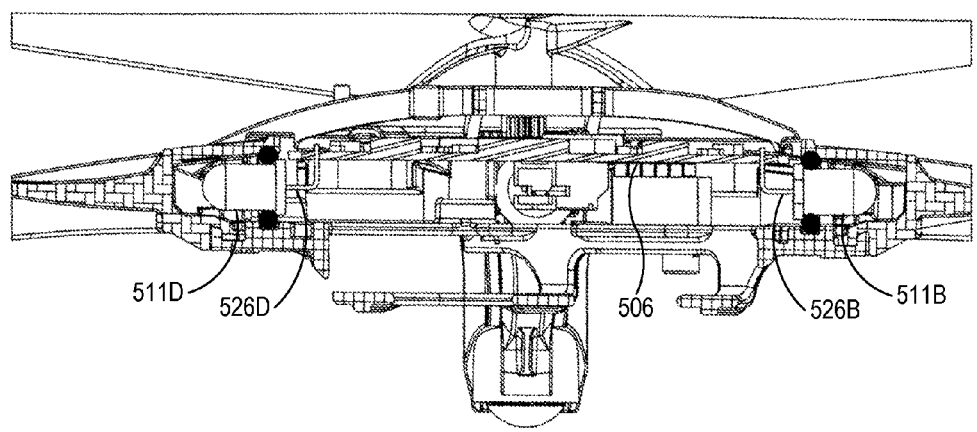
FIG. 13C is a cross-sectional view taken along line 13C-13C, the view showing a printed circuit board assembly (PCBA) mounted within a housing formed by a cover and base of a quadcopter rotorcraft.

Referring to FIGS. 12 and 13C, the light sources 511A-E may couple to the PCBA 506 at locations along the perimeter of the PCBA 506. Referring to FIGS. 4, 12, and 13A-C, in a particular embodiment, the light sources 511A-E may be implemented with locators 519A-E and sets of leads 526A-E for electrically coupling the light sources 511A-E to the PCBA 506. Each set of leads 526A-E may comprise substantially rigid metal conductors, and may be soldered to the circuit board of the PCBA to create a substantially rigid connection between each light source 511A-E and the circuit board.

According to the embodiment shown in FIGS. 12 and 13C, the PCBA 506 may be coupled to the underside of the first cover 502 by setting each light source 511A-E having a locator 519A-E mounted around each light source 511A-E into each respective locator cradle 520A-E so that each locator 519A-E is snugly fit in an interference fit with each locator cradle 520A-E. In this configuration, the circuit board of the PCBA 506 may be coupled to the first cover 502 without making contact with any internal surfaces of the first cover 502.

The base 504 may be coupled to the first cover 502 as described above, and locator recesses 518A-E may receive the lower portion of the locators 519A-E and fix the location of each light source 511A-E within the center pod assembly 500. The PCBA 506 may be operably coupled to both the first cover 502 and base 504 within the formed center pod assembly 500 without the PCBA 506 contacting any portion of the interior surface of the center pod assembly 500.

In this arrangement, the PCBA 506 may also be vibrationally isolated from the center pod assembly 500 and rotor assembly 100, 200, 300, and 400 components. The resilient and elastically deformable material of the locators 519A-E may provide vibration absorbing protection to the PCBA 506, insulating the PCBA 506 from impacts during rotorcraft 1000 operation as well as from vibrations induced into the rotorcraft 1000 through rotation of the propellers 104, 204, 304, and 404.

Vibrationally isolating the controls components of the rotorcraft 1000 may provide the advantages of prolonging the useful life of the rotorcraft 1000 through increased crash damage resistance and may also improve rotorcraft control and stability during flight, with the controls components protected from vibrations that may affect data collected by controls components for use in flight control.

Referring to FIG. 2, the first cover 502 may further comprise cover members 528A-D comprising bars crossing between opposing first and third arms 102, 302 and second and fourth arms 202, 402. The cover members 528A-D may be configured to crossover the PCBA 506 and provide protection to the PCBA 506 from impacts and foreign objects. It will be understood by persons of ordinary skill in the art that the cover members 528A-D may form other patterns or form a continuous surface according to design requirements for the rotorcraft 1000.

Referring to FIGS. 3 and 4, the first cover 502 may further comprise a connector clip 536 configured to hold a power connector (not shown) extending from the circuit board of the PCBA 506. The connector clip 536 may comprise a shelf 538 extending generally perpendicular to the side surface 508C. A rail 539 may extend from an end of the shelf 538 generally parallel to the side surface 508C.

A tab 540 may extend from an end of the rail 539. The side surface 508C, shelf 538, and rail 539 may form at least a partially enclosed space for retaining a power connector configured to plug into a connector from a battery (not shown). The tab 540 may be configured to clip onto a side surface of a power connector to lock the power connector into place. The shelf 538 and rail 539 may be bent away from the side surface 508C to release the tab 540 from the power connector.

Referring to FIG. 11, the base 504 may further comprise a battery receptacle 514 configured to hold a substantially prismatically-shaped battery (not shown) to support operation of the rotorcraft 1000. The battery receptacle 514 may comprise support plates 515A, B extending within a first plane and cross bars 516A, B extending within a second plane offset from the first plane.

The cross bars 516A, B may be offset from each other by distance configured to support a length of a battery. A support beam 517 may extend between the cross bars 516A, B to further support an underside of a battery. The cross bars 516A, B may further comprise an approximately ninety (90)

degree bend configured to accommodate a depth of a battery and support sides of the battery.

The battery may be inserted in the battery receptacle 514 through a battery opening 521 in the base 504 and slid into the space formed by and between the support plates 515A, B and the cross bars 516A, B. The tabs 524A, B may extend in a direction substantially perpendicular to the direction of insertion of the battery and may function as stops to prevent the battery from falling out through an opening in the battery receptacle 514 opposite from the battery opening 521. Additionally, the tabs 524A, B may allow the battery to be aligned properly with the center of gravity C1.

Referring to FIGS. 1 and 4, the center pod assembly 500 may further comprise a pod cover 542 configured to couple on a top surface of the first cover 502. The pod cover 542 may comprise aesthetically pleasing curvatures, designs, and other features. In some embodiments, the pod cover 542 may be made of a plastic, and may further comprise a two-tone plastic, for example black and red.

Referring to FIGS. 2, 4, and 12, the pod cover 542 may couple to the first cover 502 by fasteners 535A-C (e.g. screws) extending through second cover apertures 534E-G in the pod cover 542 and threadably coupling with corresponding apertures (not shown) in the underside of the pod cover 542.

Having thus described the present invention by reference to certain of its exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Additional details are presented the Appendix attached hereto and incorporated by reference for all purposes. Many such variations and modifications may be considered desirable by those skilled in the art based upon a review of the foregoing description of exemplary embodiments. Accordingly, it is appropriate that any claims supported by this description be construed broadly and in a manner consistent with the scope of the invention.

The invention claimed is:

1. A radio controlled model rotorcraft having an electronics compartment, the model rotorcraft comprising:
   a circuit board;
   at least one light source electrically coupled to the circuit board; and
   a housing, the housing comprising:
     a first frame;
     a second frame removably coupled to the first frame; and
     one or more housing inner surfaces;
   wherein the circuit board is mounted to the first frame and the second frame by the at least one light source;
   wherein the circuit board is disposed within the housing spaced apart from each housing inner surface; and
   at least one rotor assembly, the at least one rotor assembly comprising at least one arm extending from the housing and at least one rotorcraft component.

2. The model rotorcraft of claim 1, further comprising:
   the first frame comprising at least one first recess, the at least one first recess receiving the at least one light source; and
   wherein the circuit board is mounted to the first frame and the second frame by the at least one light source received within the at least first recess.

3. The model rotorcraft of claim 2, further comprising at least one locator member coupled to the at least one light source.

4. The model rotorcraft of claim 3, wherein the at least one locator member coupled to the at least one light source comprises an elastically deformable material.

5. The model rotorcraft of claim 4, wherein the at least one locator member coupled to the at least one light source is configured to at least partially absorb vibration caused by operation of the at least one rotorcraft component of the at least one rotor assembly.

6. The model rotorcraft of claim 4, wherein the at least one locator member coupled to the at least one light source comprises a continuous loop of material.

7. The model rotorcraft of claim 2, the second frame further comprising at least one second recess, the at least one second recess cooperating with the at least one first recess to receive and secure the at least one light source.

8. The model rotorcraft of claim 7, wherein the position of the at least one light source received within the at least one first recess and the at least one second recess is fixed by the respective first and second recesses against movement in at least three orthogonal directions.

9. The model rotorcraft of claim 2, wherein the at least one light source received by the at least one first recess is secured against movement in at least one direction.

10. The model rotorcraft of claim 1, the housing further comprising at least one opening passing outwardly through at least one of the one or more inner surfaces of the housing, wherein the at least one opening is optically paired with, and receives light most intensely from, the at least one light source.

11. The model rotorcraft of claim 1, wherein the circuit board is mounted within the housing solely by a plurality of the light sources.

12. A radio controlled model rotorcraft, comprising:
   a circuit board;
   at least one first light source electrically coupled to the circuit board; and
   a housing, comprising:
     a first frame, at least a portion of the first frame comprising at least one first light securing surface;
     a second frame coupled to the first frame; and
     wherein the at least one first light securing surface secures at least a portion of the at least one first light source between the coupled first and second frames;
   wherein the circuit board is mounted to the first frame by the at least one first light source secured by the at least one first light securing surface; and
   at least one rotor assembly comprising an arm, the arm further comprising at least one light transmitting channel extending from the housing, the at least one light transmitting channel configured to allow light from the at least one first light source to be emitted beyond the housing and into the at least one light transmitting channel.

13. The model rotorcraft of claim 12, wherein at least a portion of the at least one first light source is disposed within at least a portion of the at least one light transmitting channel.

14. The model rotorcraft of claim 12, wherein the light transmitting channel comprises light conducting material, and wherein the light transmitting channel forms at least a portion of a socket, the socket receiving at least a portion of the at least one first light source and transmitting at least a portion of light emitted from the at least one first light source into the light transmitting channel.

15. The model rotorcraft of claim 12, wherein at least a portion of the second frame comprises at least one second light securing surface; and wherein the at least one second light securing surface secures at least a portion of the at least one first light source between the coupled first and second frames.

16. The model rotorcraft of claim 15, wherein the position of the first light source is fixed in at least three orthogonal directions.

17. The model rotorcraft of claim 12, further comprising at least one locator member coupled to the at least one first light source, the at least one first light source at least partially received by the first frame.

18. The model rotorcraft of claim 17, wherein the at least one locator member comprises an elastically deformable material.

19. The model rotorcraft of claim 17, wherein the at least one locator member is configured to at least partially isolate the circuit board from vibration caused by operation of rotorcraft components spaced apart from the circuit board.

20. The model rotorcraft of claim 17, wherein the at least one locator member comprises a continuous loop of material and is disposed around the at least one first light source.

21. A compartment for receiving an electronic component of a radio controlled model rotorcraft, comprising:
 a first frame
 a circuit board;
 at least one light source electrically coupled to the circuit board;
 wherein the first frame receives and at least partially encloses the at least one light source;
 wherein the circuit board is mounted within the first frame by the at least one light source;
 wherein the circuit board is disposed within the first frame spaced apart from the inner surfaces of the first frame; and
 wherein the first frame comprises at least one opening passing outwardly through a surface of the first frame, the at least one opening optically paired with, and receiving light from the at least one light source.

22. The compartment of claim 21, wherein the first frame comprises at least one first recess, the at least one first recess receiving the at least one light source.

23. The compartment of claim 22, wherein the at least one light source received by the first recess is secured against movement in at least one direction.

24. The compartment of claim 23, further comprising at least one locator member coupled to the at least one light source received within the at least one first recess.

25. The compartment of claim 24, wherein the at least one locator member comprises a loop of an elastically deformable material, configured to snugly fit around the at least one light source.

26. The compartment of claim 25, wherein the inner surface of the at least one locator member grips the at least one light source, providing frictional resistance to removal of the locator member from the light source.

27. A compartment for receiving an electronic component of a radio controlled model rotorcraft, comprising:
 a housing at least partially forming an enclosure;
 a circuit board at least partially enclosed within the housing, the circuit board comprising a substrate portion disposed substantially within a first plane; and
 at least one light source secured to and electrically coupled to the circuit board;
 wherein the at least one light source is oriented to extend substantially away from the circuit board, along a direction substantially aligned with the first plane; and
 wherein the circuit board is disposed within the housing and spaced apart from each inner surface of the housing.

28. The compartment of claim 27, wherein the at least one light source comprises one or more leads, each lead soldered to the circuit board proximal to an outer edge of the substrate portion.

29. The compartment of claim 27, wherein the housing comprises at least one opening passing through at least a portion of a surface of the housing, the at least one opening disposed in a plane substantially orthogonal to the first plane.

30. The compartment of claim 27, wherein the housing comprises at least one opening passing through at least a portion of a surface of the housing, wherein the at least one opening optically paired with, and receives light most intensely from, the at least one light source.

* * * * *